(12) United States Patent
O'Rourke

(10) Patent No.: US 12,271,549 B2
(45) Date of Patent: Apr. 8, 2025

(54) METHOD AND SYSTEM OF MEASURING TACTILE FORCE FEEDBACK

(71) Applicant: SANCTUARY COGNITIVE SYSTEMS CORPORATION, Vancouver (CA)

(72) Inventor: Kyle O'Rourke, Campbell, CA (US)

(73) Assignee: Sanctuary Cognitive Systems Corporation, Vancouver (CA)

(*) Notice: Subject to any disclaimer, the term of this patent is extended or adjusted under 35 U.S.C. 154(b) by 0 days.

(21) Appl. No.: 17/944,108

(22) Filed: Sep. 13, 2022

(65) Prior Publication Data
US 2023/0297186 A1    Sep. 21, 2023

Related U.S. Application Data

(60) Provisional application No. 63/243,703, filed on Sep. 13, 2021.

(51) Int. Cl.
*G06F 3/041* (2006.01)

(52) U.S. Cl.
CPC .............................. *G06F 3/04166* (2019.05)

(58) Field of Classification Search
None
See application file for complete search history.

(56) References Cited

U.S. PATENT DOCUMENTS

| | | | |
|---|---|---|---|
| 2007/0113681 A1* | 5/2007 | Nishimura | G06F 3/04144 73/862.046 |
| 2007/0198926 A1* | 8/2007 | Joguet | G06F 3/0488 715/702 |
| 2015/0091858 A1* | 4/2015 | Rosenberg | G06F 3/04144 345/174 |
| 2017/0300166 A1* | 10/2017 | Rosenberg | G06F 3/0443 |
| 2019/0018539 A1* | 1/2019 | Zhong | G06F 3/04166 |
| 2022/0317853 A1* | 10/2022 | Kranski | H03K 17/9622 |

* cited by examiner

*Primary Examiner* — Amr A Awad
*Assistant Examiner* — Donna V Bocar
(74) *Attorney, Agent, or Firm* — Adenike Adebiyi; Thomas Mahon

(57) ABSTRACT

Provided is a process that includes: obtaining low-sensitivity values mapped to respective locations within an area of a sensor array; determining differences between respective ones of the low-sensitivity values and respective ones of prior values for the locations, one example being tare values for the locations; obtaining a set of detection locations within the area of the sensor array based on differences exceeding a threshold; obtaining, after switching at least a portion of the sensor array to a high sensitivity mode, high sensitivity values mapped to respective locations within the area of the sensor array, each of the locations mapped to a respective second prior value, one example being a tare value in the high sensitivity mode; determining, for each location within the set of detected locations, a value based on the respective high sensitivity value and the respective second prior value; and outputting, the values and the locations.

15 Claims, 18 Drawing Sheets

METHOD AND SYSTEM OF MEASURING TACTILE FORCE FEEDBACK

CROSS-REFERENCE TO RELATED APPLICATIONS

This application claims priority to, and the benefit of, U.S. Provisional Patent Application 63/243,703 filed on 13 Sep. 2021, titled "SCANNING OF GRID-BASED SENSING ARRAYS." The entire content each of the aforementioned patent-filings are hereby incorporated by reference.

BACKGROUND

1. Field

The present disclosure relates generally to robotics and, more specifically, to localization and measurement of a sensor array.

2. Description of the Related Art

Dynamic mechanical systems are often controlled with computational processes. Examples include robots, industrial processes, life support systems, and medical devices. Generally, such a process takes input from sensors indicative of state of the dynamic mechanical system and its environment and determines outputs that serve to control various types of actuators within the dynamic mechanical system, thereby changing the state of the system and potentially its environment.

Dynamic mechanical systems relying on tactile force feedback present particularly complex measurement challenges. Many capacitive touch sensing technologies are generally not well suited for collecting tactile force feedback measurements. Other types of sensors, such as point-in-place sensors (e.g., like a port-pressure sensor) or strain gauge sensors, while well suited for collecting tactile force feedback measurements, are generally not well suited for localizing and measuring multiple points of tactile force feedback within an area. Moreover, many existing measurement techniques, whether the above or other technologies are used, yield a high rate of false positives for localization or incorrect force measurements because their reliance on relatively stable operating states fails to address the challenges imposed on sensors by dynamic mechanical systems. That said, none of the preceding discussion of tradeoffs of various technologies should be read to suggest that any of these approaches is disclaimed or disavowed.

SUMMARY

The following is a non-exhaustive listing of some aspects of the present techniques. These and other aspects are described in the following disclosure.

Some aspects include a process that includes: obtaining, by a microcontroller, low-sensitivity values mapped to respective locations within an area of a sensor array, each of the locations mapped to a respective first tare value; determining, by the microcontroller, differences between respective ones of the low-sensitivity values and respective ones of the tare values for the locations; obtaining, by the microcontroller, a set of detected force locations within the area of the sensor array based on differences exceeding a threshold; obtaining, by the microcontroller after switching at least a portion of the sensor array to a high sensitivity mode, high sensitivity values mapped to respective locations within the area of the sensor array, each of the locations mapped to a respective second tare value; determining, for each location within the set of detected force locations, a force value based on the based on the respective high sensitivity value and the respective second tare value; and outputting, for each of the locations with the set of detected force locations, the force value and the location.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
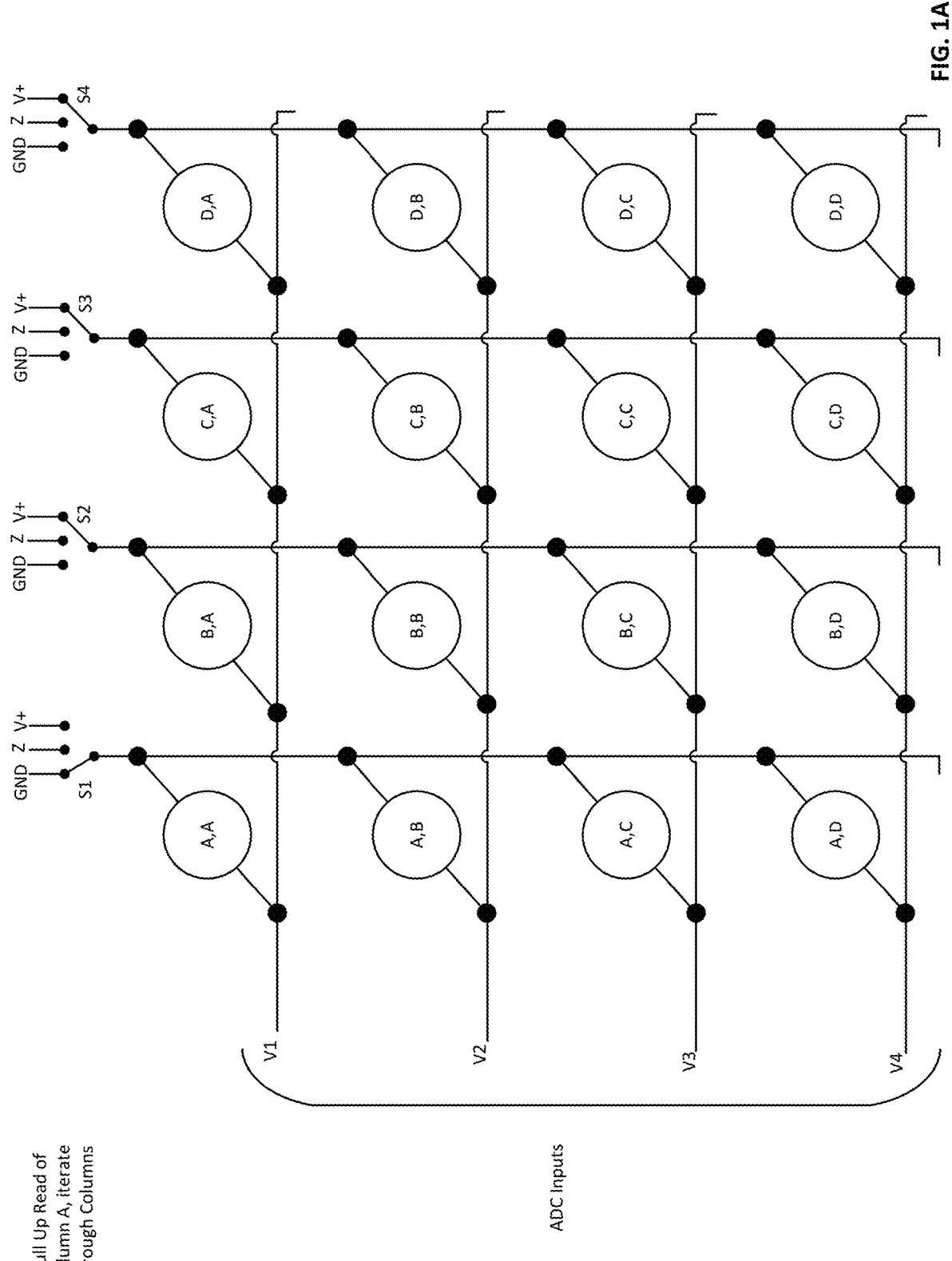
FIG. 1A illustrates a schematic that shows a topology of a grid-based resistive sensing array, configured for a low-sensitivity read in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of robotics or touch sensors. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Readout of selectively-conductive elements (e.g., switches, force-sensitive resistors, resistive memory elements, and the like) in cross-bar arrays is challenging. Keyboard designers, for example, often sense key switches at the intersections of rows and columns of conductors, giving rise to the problem of ghosting, where keyboards cannot read out certain combinations of keypresses. Similarly, memory designers have developed various techniques to deal with the sneak-path problem is crossbar resistive memory arrays, where readout of one memory element is affected by interference from the state of others in the array. In these scenarios, parasitic alternate current paths can bypass the selectively-conductive element being addressed for reading, thereby producing cross-talk that interferes with the attempt to read the resistive state of the targeted selectively-conductive element. It can appear that the resistive element is less resistive than it actually is due to the parasitic parallel current paths. This issue is particularly acute where resistance is measured with finer granularity, e.g., in multi-bit-per-cell resistive memory arrays or in many force-resistive sensor arrays.

Approaches exist to mitigate these problems in crossbar memory arrays and keyboards, like placing a diode at each sensing point or keyboard key. But adding one diode for each cell may not be feasible in non-integrated use cases with relatively spatially dense arrays, where the cost and size of discrete components may be prohibitive (which is not to suggest that use of diodes is disclaimed). These challenges are especially prevalent when space or cost constraints exist, as is often the case in commercial use cases.

For example, in many applications it may be desirable to use a grid-based tactile sensing array with a relatively high degree of precision afforded by relatively high spatial densities of read points (e.g., 4, 16, 32 or more per square centimeter). Additionally, where cost is a concern, examples of grid-based tactile sensing arrays described herein may be relatively low cost to other implementation utilizing discrete sensors rather than a grid-based (or other tiling, such as an irregular tiling) array.

Example embodiments may execute a dual-scanning technique on a force-sensitive tactile array, such as a force sensitive resistor array. Examples of a force-sensitive tactile array include a grid-like arrangement of potential points (e.g., discrete units of area that produce a single aggregate signal responsive to force) of measurement of force (e.g., resultant from force exerted by a contact within a corresponding area of the array or vice versa). Dual-scanning techniques disclosed herein may improve accuracy of detection of points of contact and measurement of force of a contact. As an example, a robot including a force-sensitive tactile array may interact with objects within an environment (or itself). In many cases, those objects with which a robot interacts are fragile or otherwise susceptible to damage when contacted with an excessive amount of force. Unevenly shaped objects, such as those encountered in unstructured environments, may produce multiple points of contact to a member by which a robot interacts with those objects (e.g., by grasping or other action). Additionally, interactions with certain objects may produce a contact over a broad area of a force-sensitive tactile array, which may cause multiple sensing points of the force-sensitive tactile array to report contact (e.g., contact detection across a broad area of the array). These and other example cases of contact detection by a sensor are frequently encountered by robots that interact with their environment. Examples pertaining to contact detection in relation to grasping are important to quantify accurately for dexterous manipulation and grasp stability classification operations. For example, a robot may approach and interact (e.g., grasp) an object from different positions, which may result in different contact points, some of which may yield to a different maximum force, and dexterous or other members of the robot may need to be manipulated differently based on approach and other feedback, such as where and force of contacts on a member. Accordingly, accurate localization of points of contact within a sensing array and accurate measurements of force at each contact point, such as afforded by disclosed techniques, are expected to improve reliability of interactions between a robot and its environment. Moreover, configurations of disclosed grid-based sensing arrays for which disclosed dual-sensing techniques are expected to improve reliability of interactions are expected to reduce cost relative to other bespoke sensor configurations.

In some embodiments, dual-scanning of a grid-based tactile sensing array is expected to improve detection of force contact points and measurement sensitivity at detected force contact points. Example embodiments may execute a first scan of a grid-based tactile sensing array (e.g., of all of the array, or some of the array, like every other sensing point) to determine which areas within a sensing array are active (e.g., are receiving greater than a threshold force). The first scan may scan in a sensor array in a low sensitivity state to determine which areas (e.g., which may correspond to one or more sensing points) within the array are active. The low sensitivity state of the sensing array may reduce a likelihood of output signals from the array indicating (or processing thereof detecting) false positive contact points, or "ghost points," that do not correspond to force contact points within the area of the sensing array.

Example embodiments may execute a second scan of a grid-based tactile sensing array (e.g., of all of the array, or some of the array, like every other sensing point) to determine force (e.g., an amount of force applied within a range of forces over which the sensing point is configured to sense) at areas within a sensing array. The second scan may scan in a sensor array in a high sensitivity state to determine measurements of contact force more accurately within areas (e.g., which may correspond to one or more sensing points) of the array. The sensor array in the high sensitivity state, while outputting signals which more accurately correspond to a measure of force within an area receiving a contact, the output signals from the array can be susceptible to indicating (or processing thereof detecting) ghost points.

To mitigate ghost point detection and obtain an accurate measurement of force within an area of the sensing array experiencing a contact force, some embodiments may implement a dual-scanning technique to localize (e.g., detect) contact points, e.g., by executing the first scan, with reduced risk of ghost points and outputting binary values for each sensing point, and obtain measurements of force, e.g., by executing the second scan, corresponding to the detected contact points, and outputting 4, 8, 16, 32 or higher bit integer values indicative of a magnitude of force. Example embodiments may exclude (e.g., from a feedback loop) obtained measurements of force by the second scan that do not correspond to detected contact point areas, e.g., the binary values from the first scan may be applied as a mask to the integer values in the second scan. Some embodiments may select measurements of force within an area of the sensing array that correspond to a localized contact point to be passed on as force measurements to a feedback loop for processing. In some embodiments, measurements of force may be targeted, such as to obtain measurements corresponding to those areas (e.g., targeted scans of corresponding sensing points) to which a contact point is localized.

Some embodiments may have a data model corresponding to a sensing array, such as by one or more vectors or a matrix. Positions of values within a vector or matrix may map to corresponding areas within the sensing array. As noted above, the sensing array may be grid-like (e.g., a grid), and sensing points within the array may be mapped to positions of values within a vector or a matrix that represent corresponding locations within the array. Thus, for example, based on outputs obtained from a low-sensitivity scan, active locations within the sensing array may be detected. Those active locations may correspond to value positions within a vector or matrix. In turn, outputs obtained from a high-sensitivity scan for those value positions within a vector or matrix that correspond to the active locations may be selected (e.g., as force measurement values) for inclusion in a final processed output data structure. Thus, the output data structure includes high-sensitivity scan measurements that correspond to sensing points within the sensing array to which contact is localized by low-sensitivity scan detection of active contact point areas within the sensing array.

Some embodiments of the dual-scanning architecture are expected to allow for fusion of selectively tuned, complementary passes of a grid-based sensor array. In some examples, such as those discussed in greater detail below with reference to tactile sensing arrays, a first pass may be tuned to accurately detect the location of multiple touch points (e.g., localization of contact points) on a tactile grid, and a second pass may be tuned to accurately record the amount of force applied at each of those locations.

The present techniques are useful in a wide variety of cross-point arrays (e.g., crossbar arrays) in which resistance or impedance is read out of elements at the intersection of rows and columns of conductors that index into the array. Examples include cross-bar memory arrays with resistive memory elements and resistive touchscreens. Another example of a grid-based sensor array includes a CCD image sensor implemented with a cross-bar array architecture, and dual-scanning techniques may also be applicable to other sensor arrays susceptible to other limitations that produce artifacts in readouts (e.g., such as a rolling shutter used for readouts of a CMOS image sensor array). A first pass may include a more-rapid (relative to the next exposure) exposure pass of an image sensor. A second pass may include a longer (relative to the preceding exposure) exposure pass of the image sensor. Collected values from the respective scans may be compared to perform scene segmentation between rapidly moving and slowly moving or stationary scene elements. In some embodiments utilizing a CMOS sensor, different scans could correspond to different directions from which a rolling shutter scan of the sensor is initiated. For example, a first scan may correspond to a L->R initiation of the rolling shutter, and a second scan may correspond to a R->L initiation of the rolling shutter, and scenes may be segmented or merged to detect artifacts resultant from sensor or object movements. Another example of a grid-based sensor array is an RGB-D sensor (e.g., for measuring distance of objects). A dual-scanning architecture may oscillate between a first scan of near-field and a second scan of far-field detection to create a larger effective depth of field without requiring additional hardware. Near-field detection data may be prioritized for processing or processed to determine fine grained movements while far-field detection data may be processed to determine coarser movements or plotting future movements.

Dual-scanning architectures may, in some cases, impact effective frame rate (e.g., the rate at which measurements of all sensors is taken may be halved relative to a single scan), but certain use cases (e.g., whether for compactness or cost) may favor multiple scan modes over multiple sensors executing each scan discretely as an acceptable tradeoff. More broadly considered, some forms of dual-scanning may afford low-level dynamic control over sensor parameters based on observed signals. In some embodiments, different data types are output in the different scans: one being a binary mask, and the other having integer values over some range larger than 0-1, and the binary mask is used to filter out those integer values masked with a zero. Some examples may switch back and forth between two pre-defined modes, and contemplated embodiments dynamically selectively determine to transition between modes. For example, a first scanning mode could execute until certain criteria are met. Upon detection of meeting the criteria, a second scanning mode could execute (e.g., once or while or until other criteria are met before reversion to the first scanning mode). For example, in the context of a tactile sensing array, a first scanning mode may execute to detect any contact (and a location thereof), and upon detecting a contact, a second scanning mode may execute to determine properties of a contact (e.g., at the location thereof). In some examples, a subset of the array may be scanned, or the array (or a subset)

may be scanned at increased frequency or resolution by a given scanning mode or in response to certain criteria being met.

FIG. 1A illustrates a schematic that shows a topology of a grid-based resistive sensing array, configured for a low-sensitivity read in accordance with some embodiments. As shown, a grid-based resistive sensing array may include a plurality of sensing points, which correspond to different areas of the sensing array each producing a single aggregate value in a read operation corresponding to resistance produced in the area by some local stimuli, like force, temperature, light-intensity, and the like. For example, each sensing point may correspond to a location within an area of a tactile sensor. However, as outlined above, it should be emphasized that disclosed techniques are extendable to other types of sensors, which is not to suggest that other descriptions are limiting. Columns may include a switch (e.g., a column decoder, such as a demultiplexer responsive to a column address signal) by which a read or scanning mode may be selected. Logic controlling the switch may be implemented in hardware or software or both. Switching between modes may be effectuated by driver outputs selectively applied by a microcontroller or a switching network of the microcontroller. In some embodiments, one or more of the modes may be clock driven. Scans may raster across the sensing points, reading out one at a time, or scans may read out one entire column at a time, concurrently sensing values from each row after each column is selected.

In the illustrated example, a low-sensitivity scan of column A may correspond to a mode where column A is switched (e.g., by S1) to a read mode (e.g., ground) and other columns of the array are switched (e.g., by S2-S4) to a sensitivity scanning mode (e.g., V+ input for a low-sensitivity scan mode). Thus, for example, a scan of the illustrated configuration of a grid-based sensing array may correspond to a pull-up read of column A, where V1-V4 sense outputs correspond to row-read values from the rows of column A. V1-V4 sense outputs may be coupled to inputs of an analog to digital converter. An example low-sensitivity scan may iterate through the columns to read corresponding sense outputs (V1-V4) of row-read values of the different columns by switching a given column to a read mode (e.g., ground) and switching the sensitivity scan mode of the other columns to the low-sensitivity scan mode (e.g., V+).

As noted above, the sensing array may be grid-like, with sensing points that correspond to respective areas within the sensing array mapped to positions of values within a vector or a matrix. An example data structure, like a vector, e.g., vector A, may correspond to a set of sensed row outputs (e.g., V1-V4) obtained with respect to a read of a column A of the sensing array with value positions in the vector corresponding to the set of sensed row outputs. Similarly, an example data structure, like a matrix, having a column A may have rows respectively populated with the set of sensed row outputs (e.g., V1-V4) obtained with respect to a read of the column A of the sensing array. Example vectors or matrixes may include one or more NULL value positions in instances where a sensing array includes some columns with more (or fewer) rows than other columns.

Figure 1B:
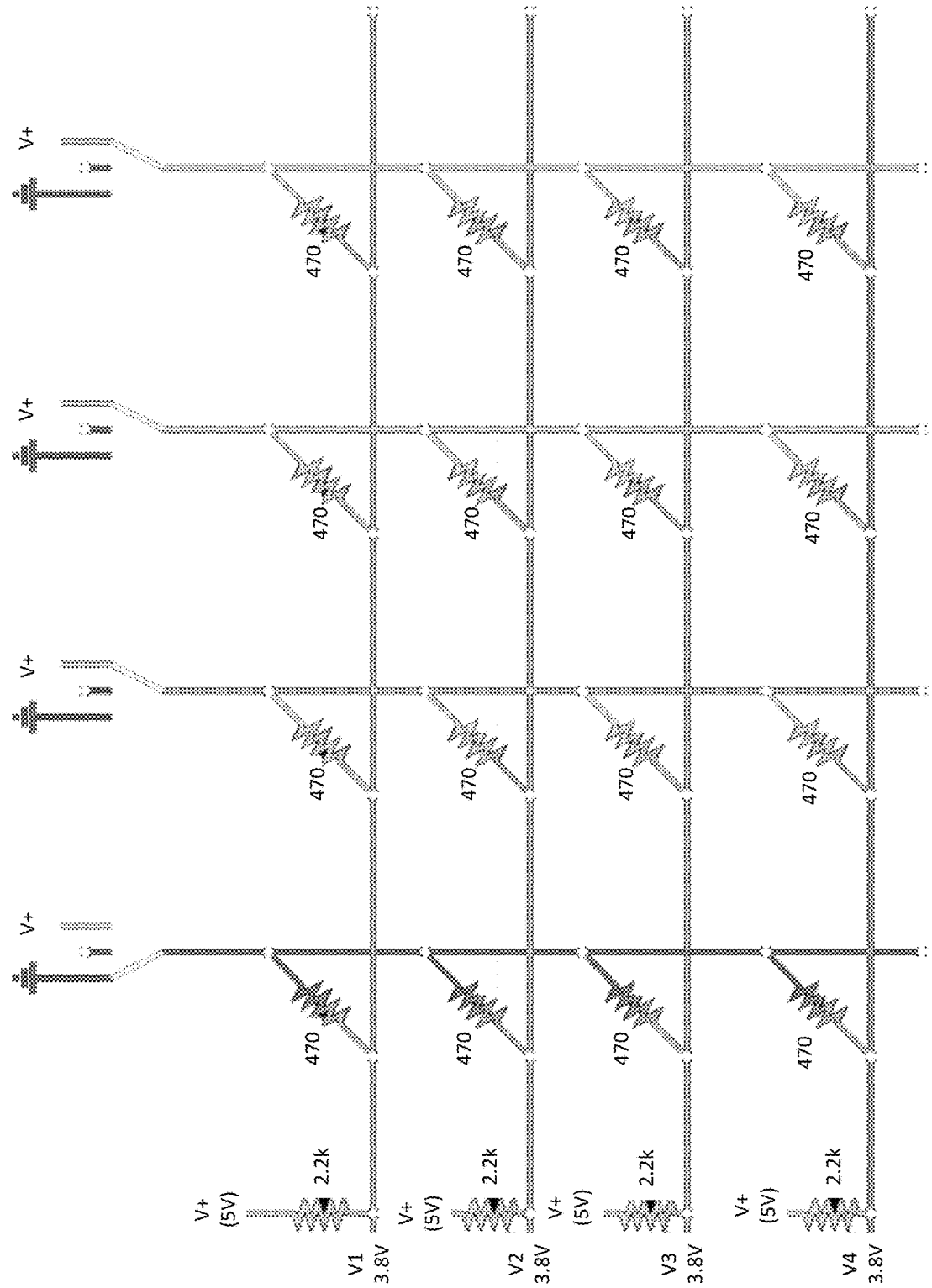
FIG. 1B is a circuit diagram that shows an example of a grid-based sensing array with example component and input-output values for a low-sensitivity read with example tare values in accordance with some embodiments.

FIG. 1B is a circuit diagram that shows an example of a grid-based sensing array with example component and input-output values for a low-sensitivity read with example tare values in accordance with some embodiments. Some embodiments may execute a scan under a given scanning mode to collect tare values (e.g., V1-V4, for instance, upon initializing the circuit). The depiction of resistive elements within the array, for example, should not be viewed as to exclude other sensing mechanisms (e.g., like a CCD or CMOS sensing element). Additionally, taring of different sensing types may be performed under different conditions. For example, considering an array of tactile sensors, tare values may be read under a given steady state condition, e.g., with or without any contact. Tare values for a CCD or CMOS sensing element may conversely be collected under certain brightness or exposure settings.

A tare value for each sensing point may be collected by iterating through reads of the columns in a given mode (e.g., low-sensitivity as shown) and storing the output read V1-V4 values for each column with a data structure, such as by one or more vectors or a matrix.

Figure 2A:
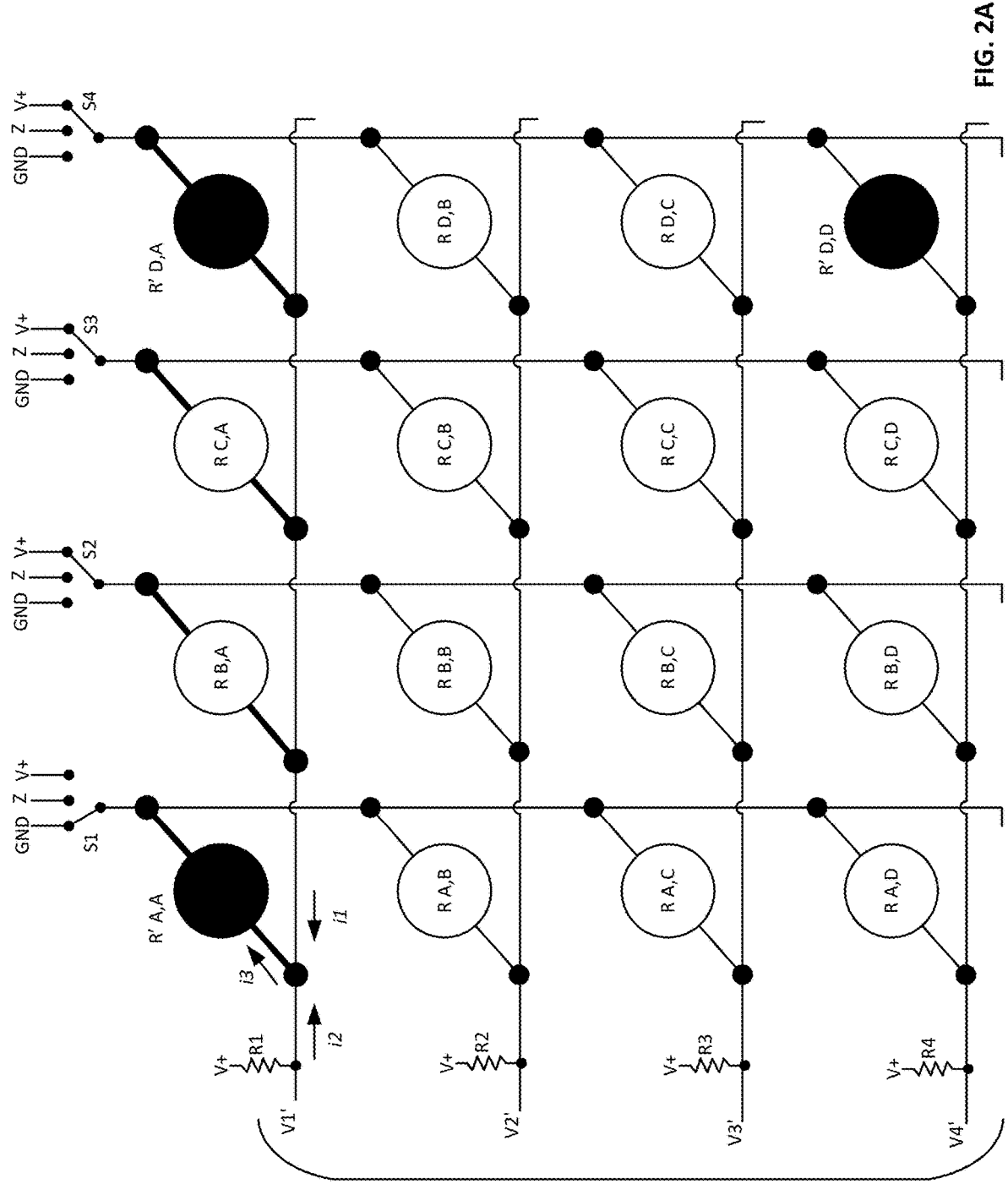
FIG. 2A is a logical and physical architecture block diagram that shows an example of a grid-based sensing array and a low-sensitivity read for multiple example contact points in accordance with some embodiments.

FIG. 2A illustrates a logical and physical architecture block diagram that shows an example of a grid-based sensing array and a low-sensitivity read for multiple example contact points in accordance with some embodiments. Three example points of contact within an example tactile sensing array by which principles of a dual-scanning architecture may be understood are illustrated. V1' through V4' correspond to sensed values, such as by a low-sensitivity scan after a tare, and may be sensed by iterating through a scan on a column by column basis. Contact with a sensing point within a sensing array may yield differences between sensed V prime values and tare V values. For example, as a result of the contact at A,A (and as well as D,A, as explained below), the value of V1' may change relative to the tare V1 value.

In the context of a tactile sensing array, R' A,A may correspond to a change in resistance with an area of a material layer between column A bar and row A bar corresponding to the sensing point. For example, a material layer between conductive layers (e.g., a first layer with column bars and a second layer with conductive row bars) may change in conductivity when impinged upon, such as by contact. The contact (e.g., by an object on a first one of the layers) impinges upon the material layer at the corresponding point of contact (e.g., as a result of the second one of the layers having a backing). Examples of such a material layer may include a force-sensitive material, which may be resistively sensitive (e.g., increase or decrease in resistance) to impinging forces (e.g., which may act in 2 or more dimensions). In other words, the material layer may be a force-sensing resistor (or FSR) layer for which its resistive properties change at points experiencing a force. One example includes a polymeric foil impregnated with carbon black to make it electrically conductive, where that conductivity is responsive to pressure, flexing, or other stresses, such as VELOSTAT. When contact pressure is applied at (or proximate to) a sensing point where a column bar and row bar overlap, the material layer receiving the contact may decrease in resistance. As the resistance between the row and column bars at that sensing point decreases (e.g., R'), a change may be measured in the output V1' for row A relative to the V1 tare values when column A is read.

As explained above, force-sensing resistive material layer may include a conductive polymer, which changes resistance in a relatively predictable manner following application of force to its surface. FSR materials are flexible and low cost. Example implementations described herein that utilize FSR materials for tactile sensing arrays may omit usage of amplifiers for boosting sensed output values, and complicated (or expensive) drive circuitry, in at least some (or all) example embodiments. However, there are certain tradeoffs, one of which can be relatively low precision relative to other force sensor types, which the dual-scanning architecture mitigates to acceptable levels to increase the number of applications suitable for low-cost FSR.

Figure 2B:
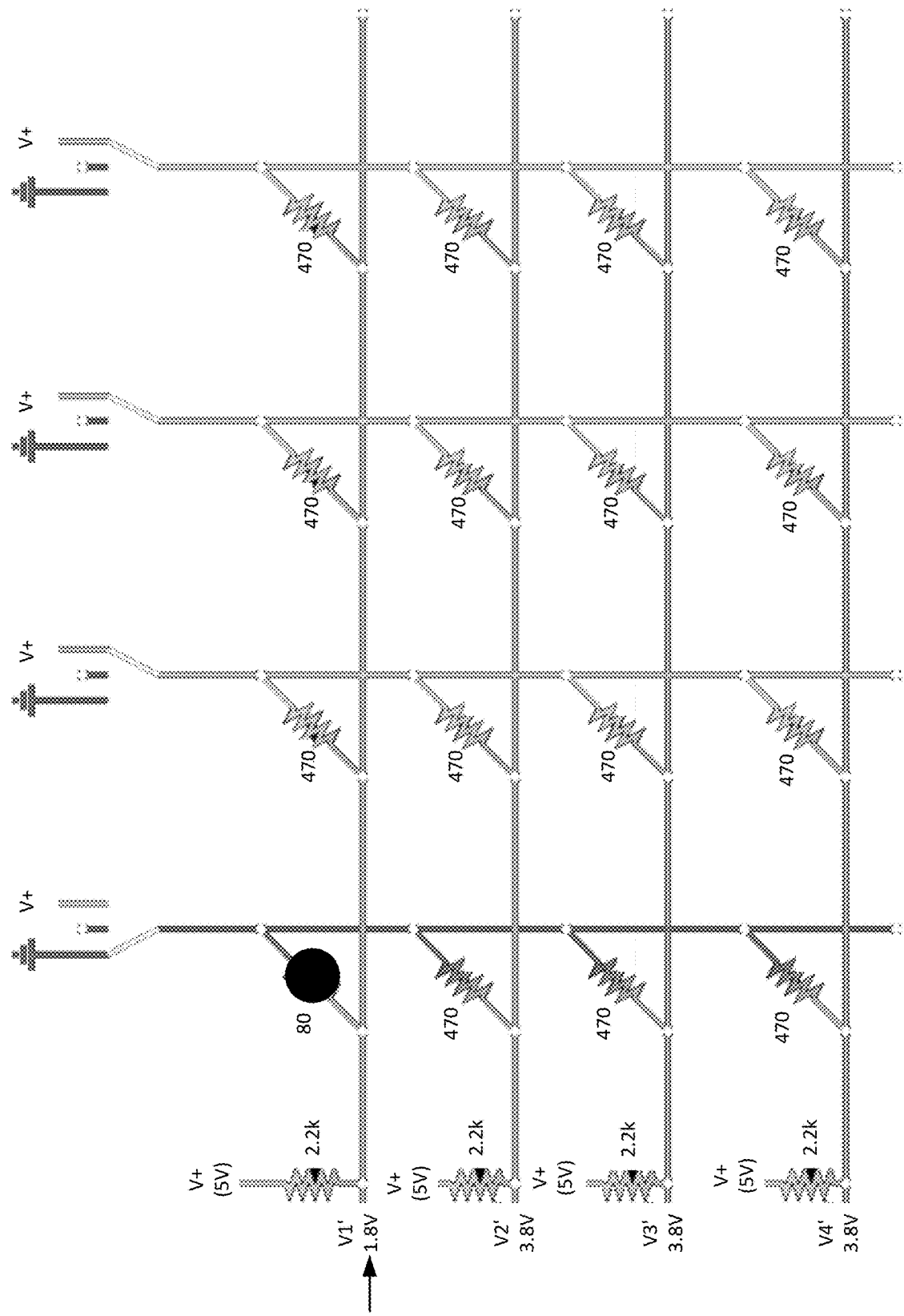
FIG. 2B is a circuit diagram that shows an example of a grid-based sensing array with example component and input-output values for a low-sensitivity read with example read values resulting from a contact point in accordance with some embodiments.

FIG. 2B illustrates a circuit diagram that shows an example of a grid-based sensing array with example component and input-output values for a low-sensitivity read with example read values resulting from a contact point in accordance with some embodiments.

Example contact yields to a change in sensed output V1' for a read of column A.

Figure 2C:
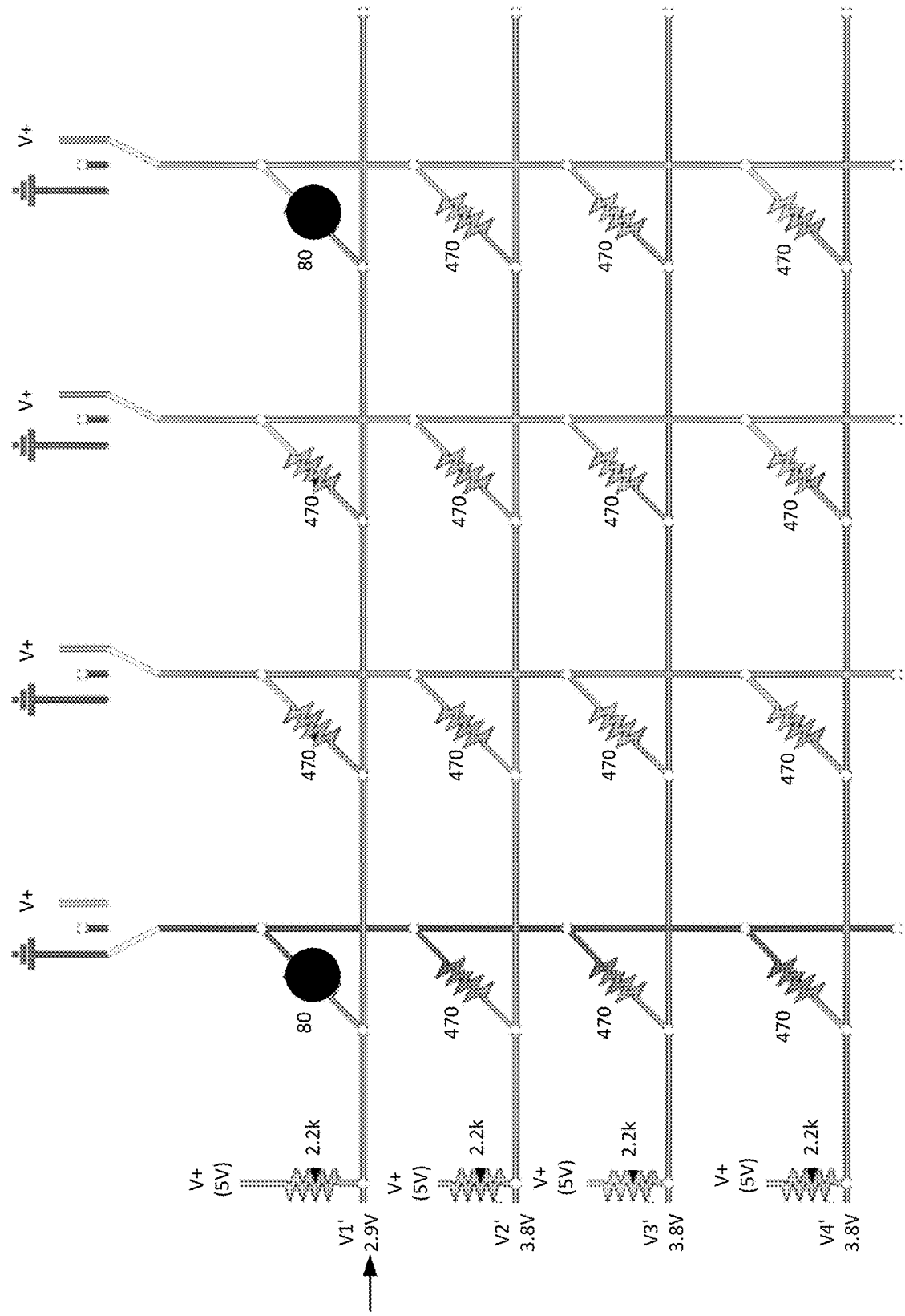
FIG. 2C and FIG. 2D are circuit diagrams that show examples of a grid-based sensing array with example component and input-output values for a low-sensitivity read with example read values resulting from multiple contact points in accordance with some embodiments.

FIG. 2C illustrates a circuit diagram that shows an example of a grid-based sensing array with example component and input-output values for a low-sensitivity read with example read values resulting from multiple contact points in accordance with some embodiments.

Example multi-contact occurring within a same row also yields to a change in sensed output V1' (row A) for a read of column A. Specifically, the sensed output V1' increases from 1.8V to 2.9V while contact force may remain unchanged. Referred to above as halving, this condition can drastically impact suitability of V1' during a low-sensitivity read for an accurate force measurement at A,A.

Figure 2D:
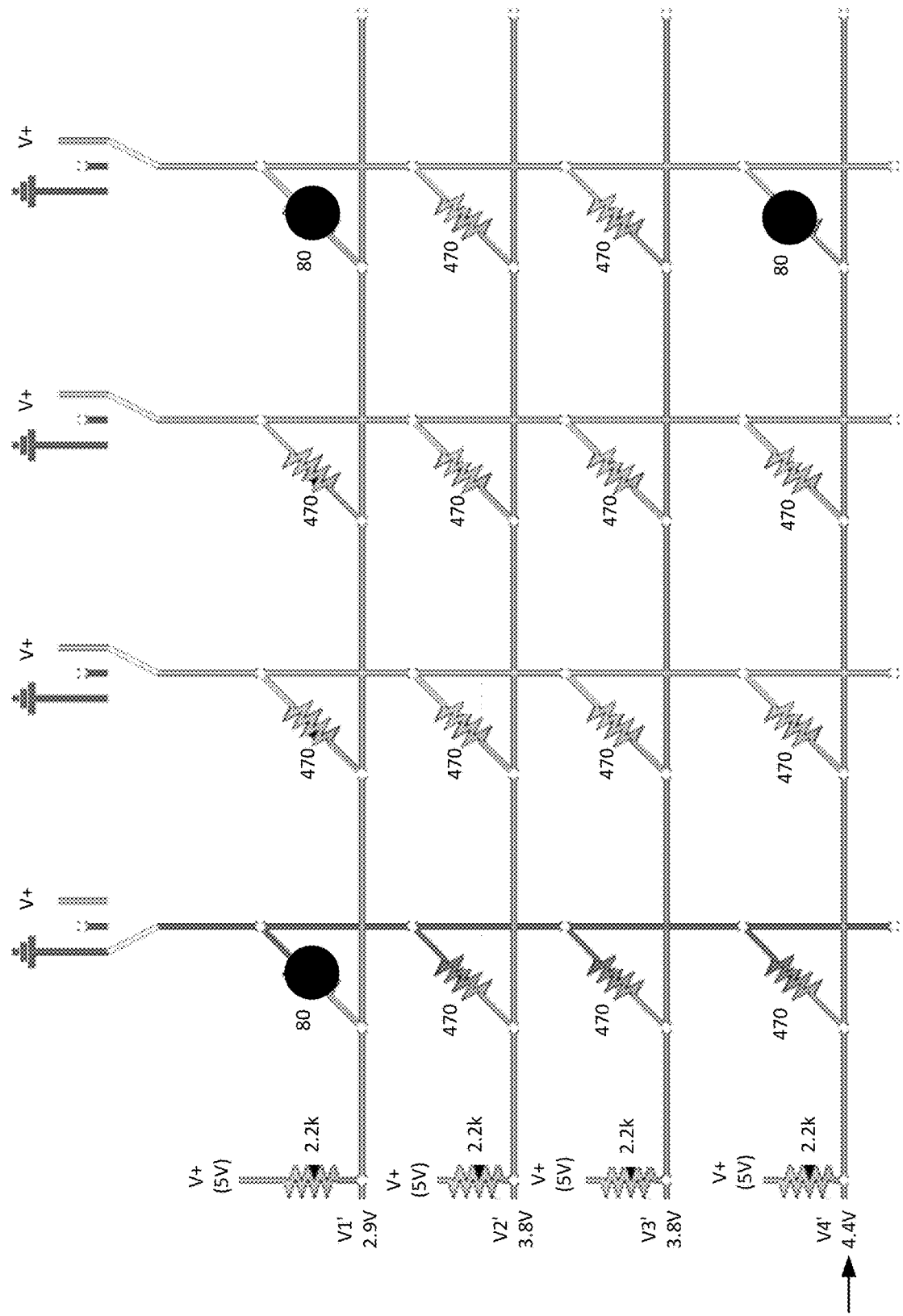

FIG. 2D illustrates a circuit diagram that shows an example of a grid-based sensing array with example component and input-output values for a low-sensitivity read with example read values resulting from multiple contact points in accordance with some embodiments.

Example third contact yields to a change in sensed output V4' (row D) for a read of column A. V2' and V3' for which no contacts at sensing points within the row are made may remain relatively stable to their tare values while V1' and V4' for which contacts at sensing points with the row are made may change relative to their tare values.

Figure 3:
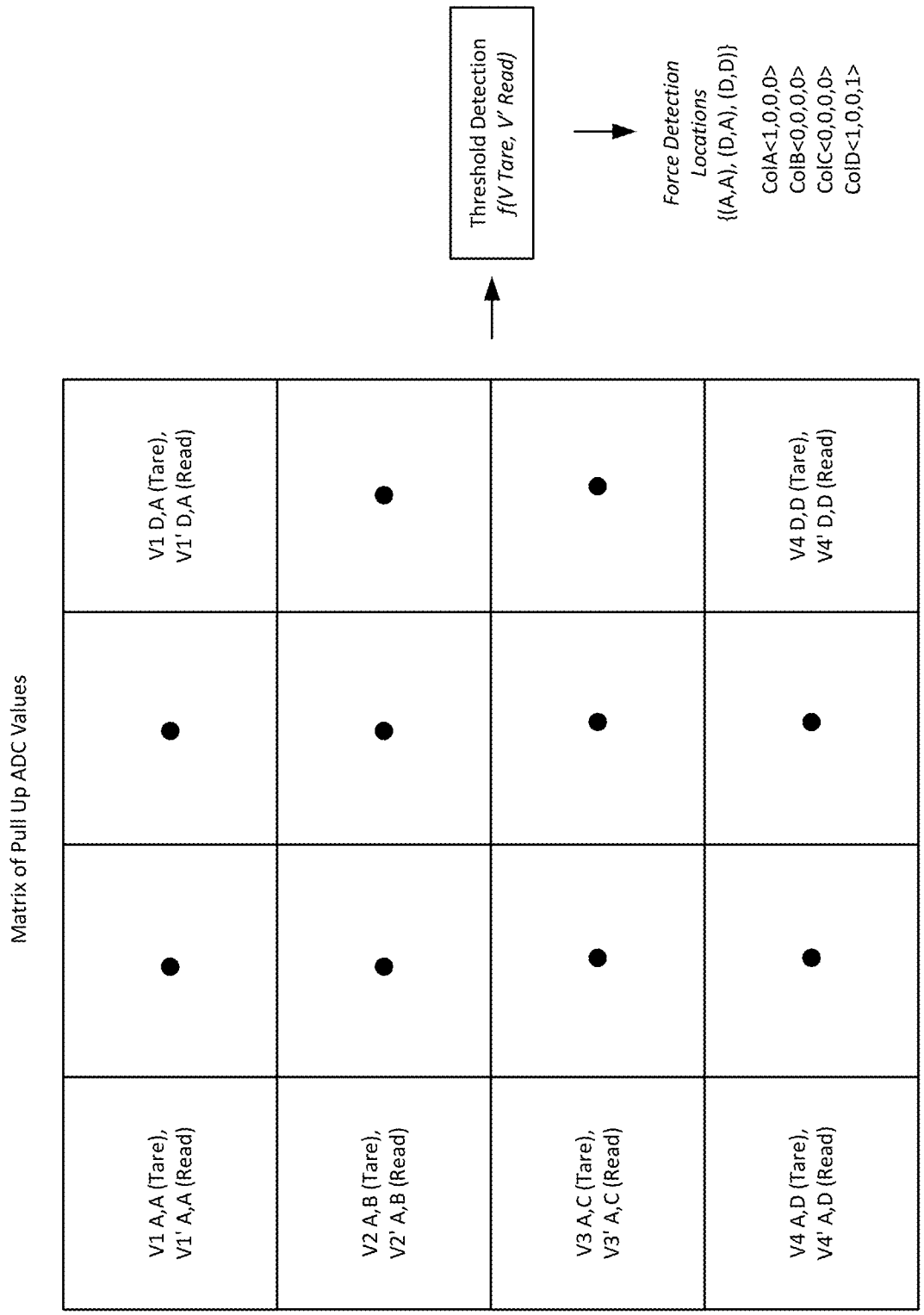
FIG. 3 is a data model and function block diagram that shows an example matrix of low-sensitivity read values and functions for detection of force locations in accordance with some embodiments.

FIG. 3 illustrates a data model and function block diagram that shows an example matrix of low-sensitivity read values and functions for detection of force locations in accordance with some embodiments.

Example data structures may be populated with tare values and sensed values for comparisons. Some embodiments may perform threshold detection, such as based on a difference between tare values and sensed values, to detect changes. In the context of the tactile sensing array example above for a read of column A, threshold detection based on differences between read and tares values for column A may correspond to a detection of contacts in row A and row D. Iterating through a scan of each column to read sensed output values for comparison to tare values may localize which sensing points received a contact based on filter criteria (e.g., one or more thresholds, which may include conditional thresholds based on whether a contact is received within a row). One or more applied threshold detection functions applied to the differences between read values and tare values yields an output indicative of the sensing points that received a contact, e.g., A,A, D,A, and D,D in the prior example figure.

The sensing points at which contact is detected as a result of a scan and application of threshold detection, may be indicated as force detection locations in a data structure.

Figure 4A:
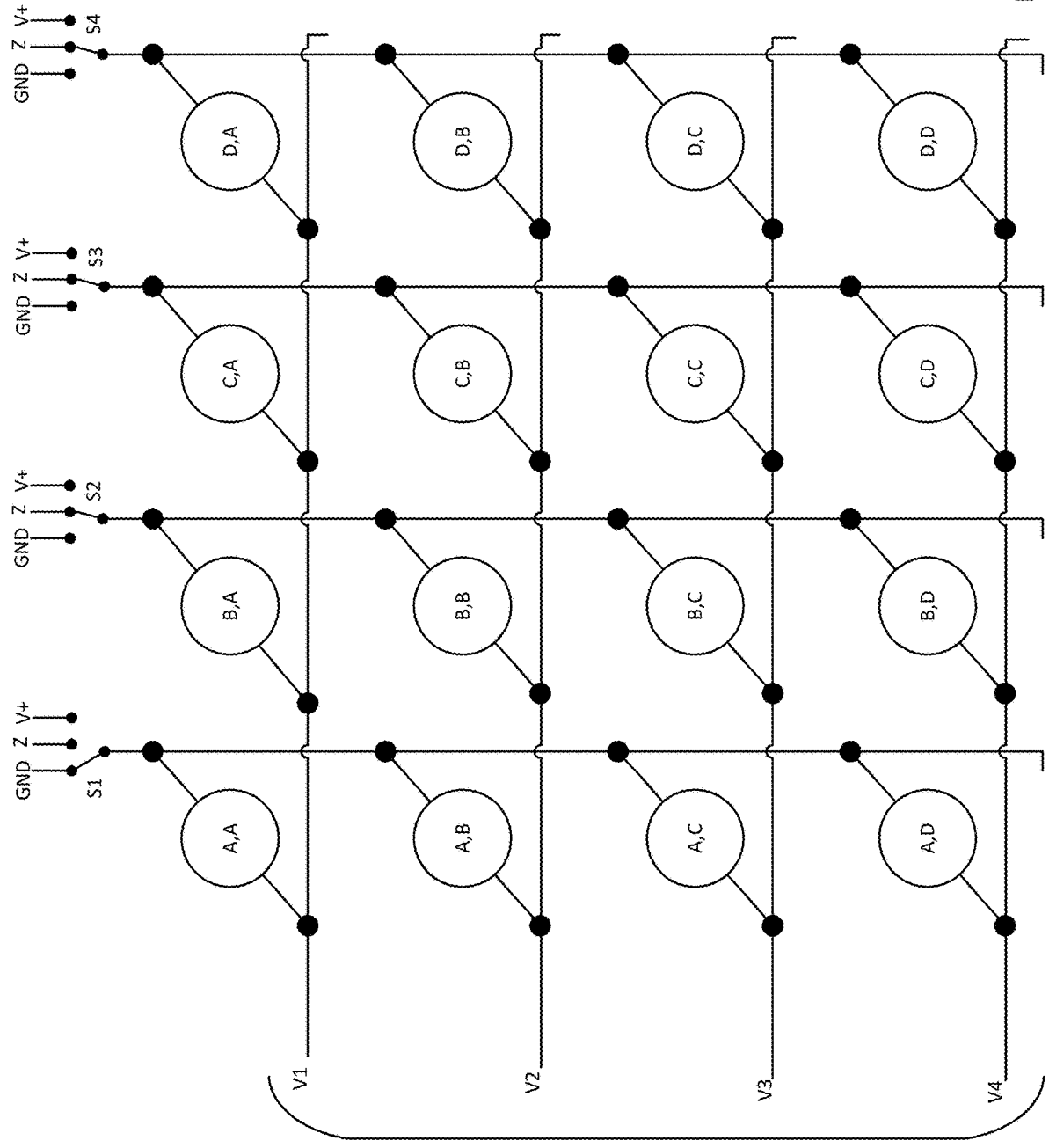
FIG. 4A is a logical and physical architecture block diagram that shows an example of a grid-based sensing array and a high-sensitivity read in accordance with some embodiments.

FIG. 4A illustrates a logical and physical architecture block diagram that shows an example of a grid-based sensing array and a high-sensitivity read in accordance with some embodiments. As shown, a grid-based sensing array includes a plurality of sensing points which correspond to different areas of the sensing array. For example, each sensing point may correspond to a location within an area of a tactile sensor. However, as outlined above, the reader is reminded that disclosed techniques are extendable to other types of sensors. Columns may include a switch by which a read or scanning mode may be selected. Such a switch need not be a physical switch. Switching between modes may be effectuated by driver outputs selectively applied by a microcontroller or a switching network of the microcontroller. In some embodiments, one or more of the modes may be clock driven.

In the illustrated example, a high-sensitivity scan of column A may correspond to a mode where column A is switched (e.g., by S1) to a read mode (e.g., ground) and other columns of the array are switched (e.g., by S2-S4) to a sensitivity scanning mode (e.g., impedance, Z, for a high-sensitivity scan mode). The impedance, Z, mode may correspond to a no-input condition, or a coupling to a high-impedance circuit. Thus, for example, a scan of the illustrated configuration of a grid-based sensing array may correspond to a Z read of column A, where V1-V4 sense outputs correspond to row-read values from the rows of column A. V1-V4 sense outputs may be coupled to inputs of an analog to digital converter. An example high-sensitivity scan may iterate through the columns to read corresponding sense outputs (V1-V4) of row-read values of the different columns by switching a given column to a read mode (e.g., ground) and switching the sensitivity scan mode of the other columns to the high-sensitivity scan mode (e.g., Z).

As noted above, the sensing array may be grid-like, with sensing points that correspond to respective areas within the sensing array mapped to positions of values within a vector or a matrix. An example data structure, like a vector, e.g., vector A, may correspond to a set of sensed row outputs (e.g., V1-V4) obtained with respect to a read of a column A of the sensing array with value positions in the vector corresponding to the set of sensed row outputs. Similarly, an example data structure, like a matrix, having a column A may have rows respectively populated with the set of sensed row outputs (e.g., V1-V4) obtained with respect to a read of the column A of the sensing array. Example vectors or matrixes may include one or more NULL value positions in instances where a sensing array includes some columns with more (or fewer) rows than other columns.

Figure 4B:
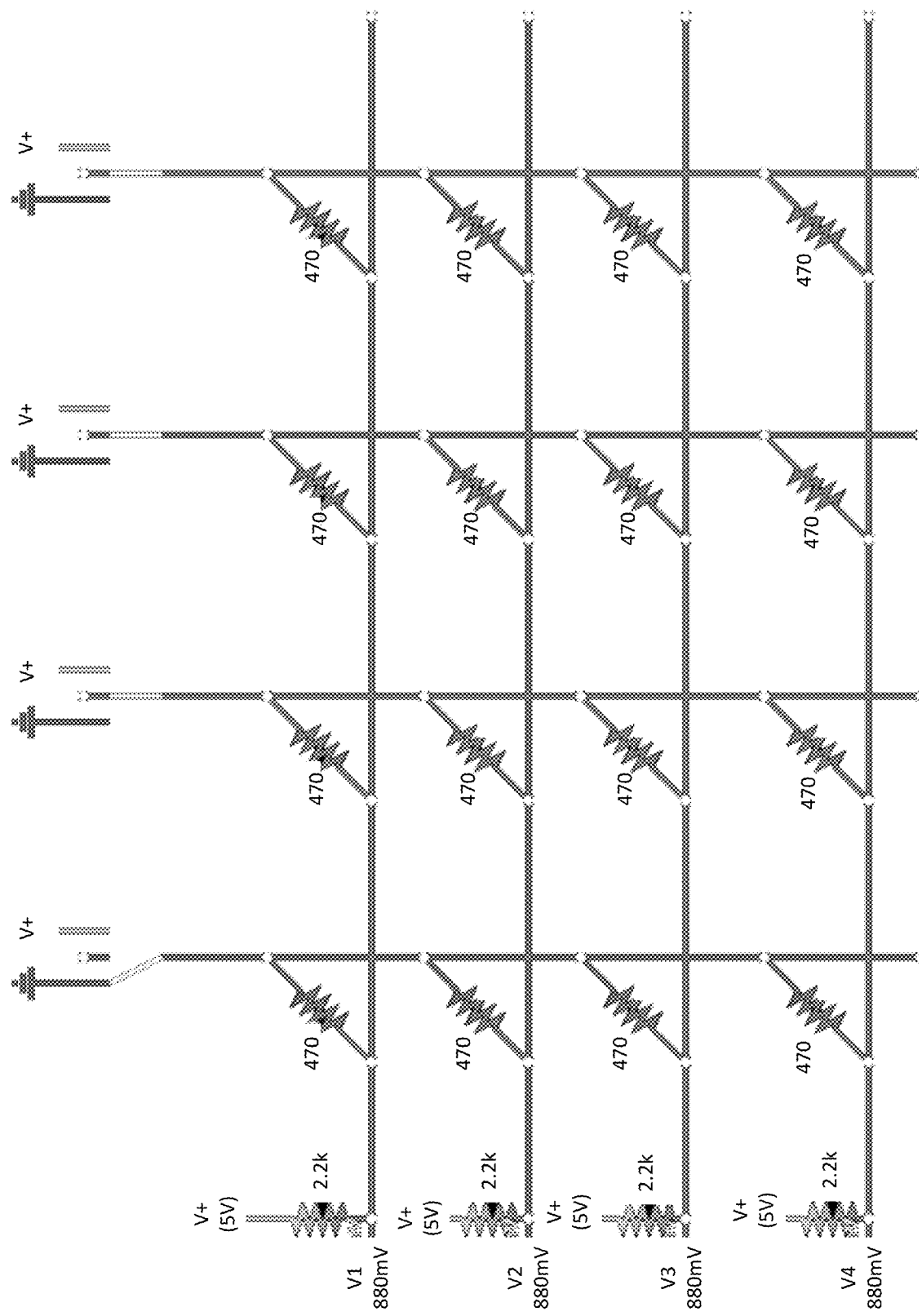
FIG. 4B is a circuit diagram that shows an example of a grid-based sensing array with example component and input-output values for a high-sensitivity read with example tare values in accordance with some embodiments.

FIG. 4B illustrates a circuit diagram that shows an example of a grid-based sensing array with example component and input-output values for a high-sensitivity read with example tare values in accordance with some embodiments.

As explained above, example embodiments may execute a scan under a given scanning mode to collect tare values (e.g., V1-V4). The illustration of resistors and resistor values within the sensing array is provided for the benefit of explanation. These elements could correspond to different or other types of components which yield changes in outputs read from a sensing array. The depiction of resistive elements within the array, for example, should not be viewed as to exclude other sensing mechanisms (e.g., like a CCD or CMOS sensing element). Additionally, taring of different sensing types may be performed under different conditions. For example, considering an array of tactile sensors, tare values may be read under a given steady state condition, e.g., with or without any contact. Tare values for a CCD or CMOS sensing element may conversely be collected under certain brightness or exposure settings.

As shown, a tare value for each sensing point may be collected by iterating through reads of the columns in a given mode (e.g., high-sensitivity as shown) and storing the output read V1-V4 values for each column with a data structure, such as by one or more vectors or a matrix.

As illustrated, V1-V4 tare values can differ between modes, in some cases by an order of magnitude. A set of tare values may thus be collected under each different mode and stored for processing of read values sensed under the respective mode. Accordingly, condition changes detected under different scanning modes may be analyzed with respect to tare values of the corresponding mode but utilized across modes as explained in more detail below.

Figure 5A:
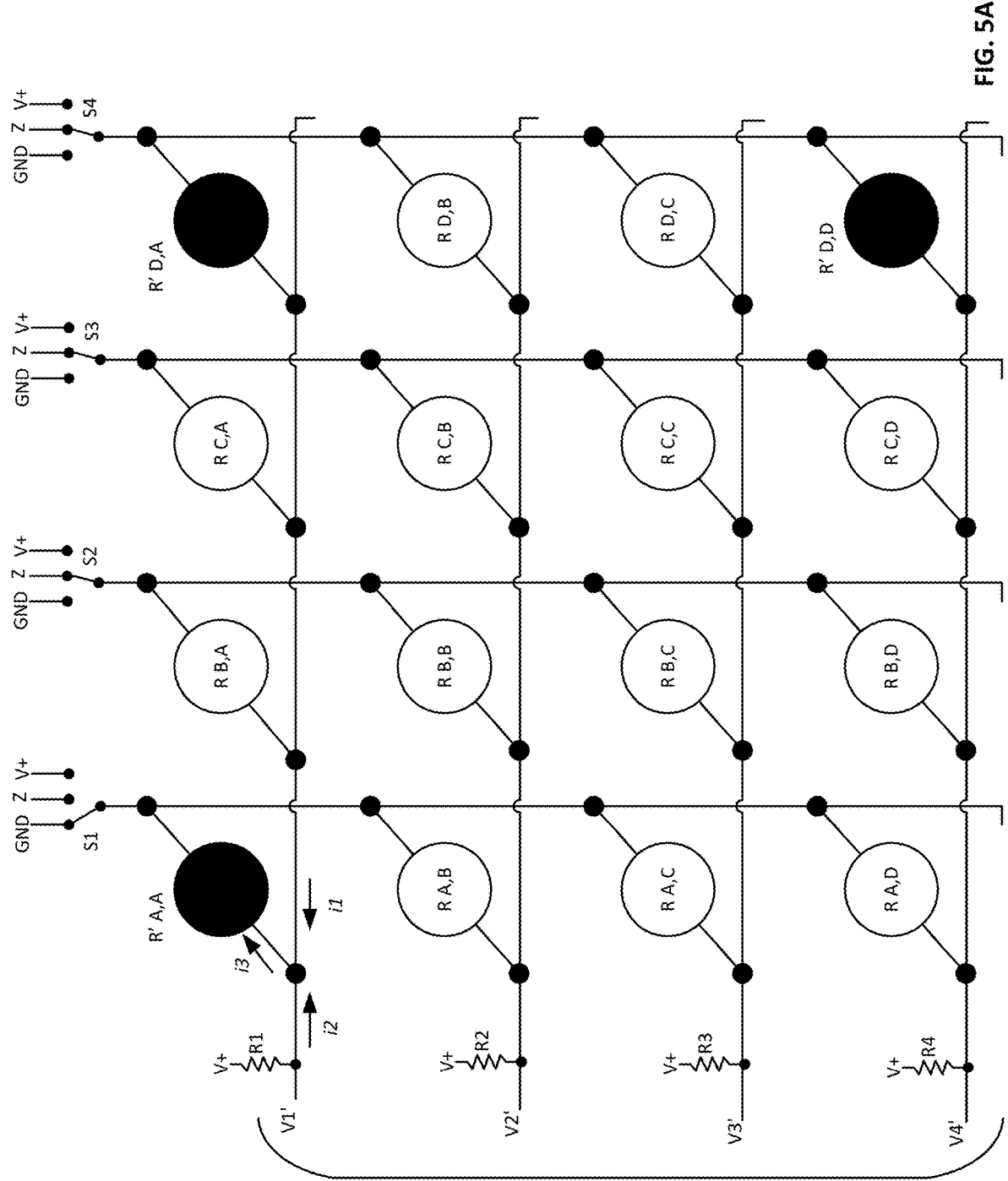
FIG. 5A is a logical and physical architecture block diagram that shows an example of a grid-based sensing array and a high-sensitivity read for multiple example contact points in accordance with some embodiments.

FIG. 5A illustrates a logical and physical architecture block diagram that shows an example of a grid-based sensing array and a high-sensitivity read for multiple example contact points in accordance with some embodiments.

Three example points of contact within an example tactile sensing array by which principles of a dual-scanning architecture may be understood are illustrated.

Relative to FIG. 2A, FIG. 5A illustrates a different scanning mode for the array, with S2-S4 configured for a Z-read (e.g., high sensitivity) rather than a pull-up read of column A (for which S1 is switched to read). As with FIG. 2A, V1' through V4' correspond to sensed values, such as by a high-sensitivity scan after a tare, and may be sensed by iterating through a scan on a column by column basis. Contact with a sensing point within a sensing array may yield differences between sensed V prime values and tare V values. For example, as a result of the contact at A,A, the value of V1' may change relative to the tare V1 value. In contrast to the low-sensitivity mode, the value of V1' may change less as a result of contact D,A, as explained below, thus yielding to a more accurate basis for a measurement of force when sensed in the high-sensitivity mode. However, the high-sensitivity mode may be more susceptible to reporting some degree of change between V1' read and V1 tare in reported V1'-V4' values for any contact with the array, among other factors, such as phantom currents, capacitance, or static which can increase the likelihood of a falsely reported contact, or ghost point, due to changes in output read voltages.

Figure 5B:
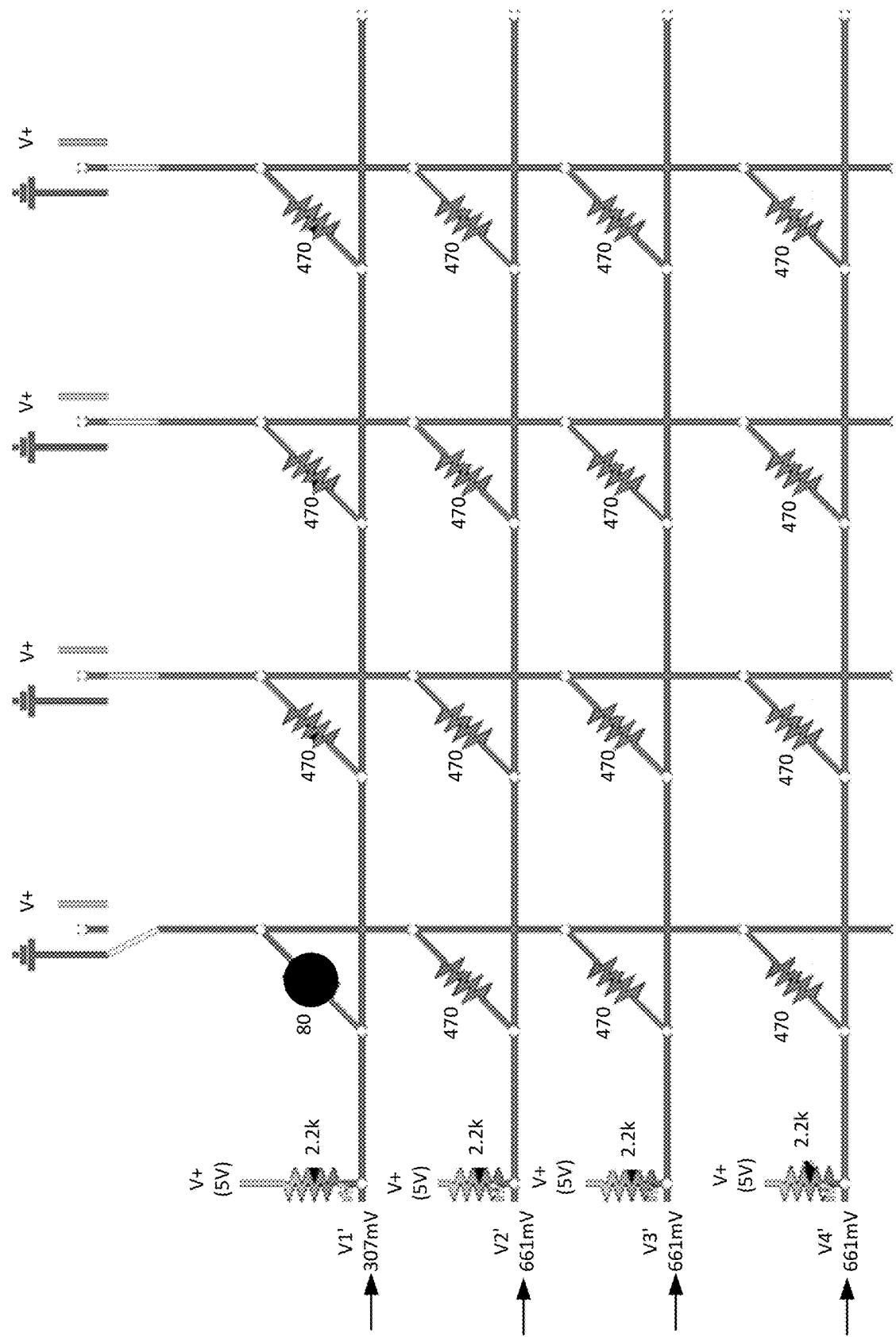
FIG. 5B is a circuit diagram that shows an example of a grid-based sensing array with example component and input-output values for a high-sensitivity read with example read values resulting from a contact point in accordance with some embodiments.

FIG. 5B illustrates a circuit diagram that shows an example of a grid-based sensing array with example component and input-output values for a high-sensitivity read with example read values resulting from a contact point in accordance with some embodiments.

Example contact yields to a change in sensed output V1' for a read of column A. Moreover, the example contact yields to a change in sensed output V2'-V4', and those changes could result in false contact point detection, or ghost points, for other sensing points within column A for which no physical contact force is received.

Figure 5C:
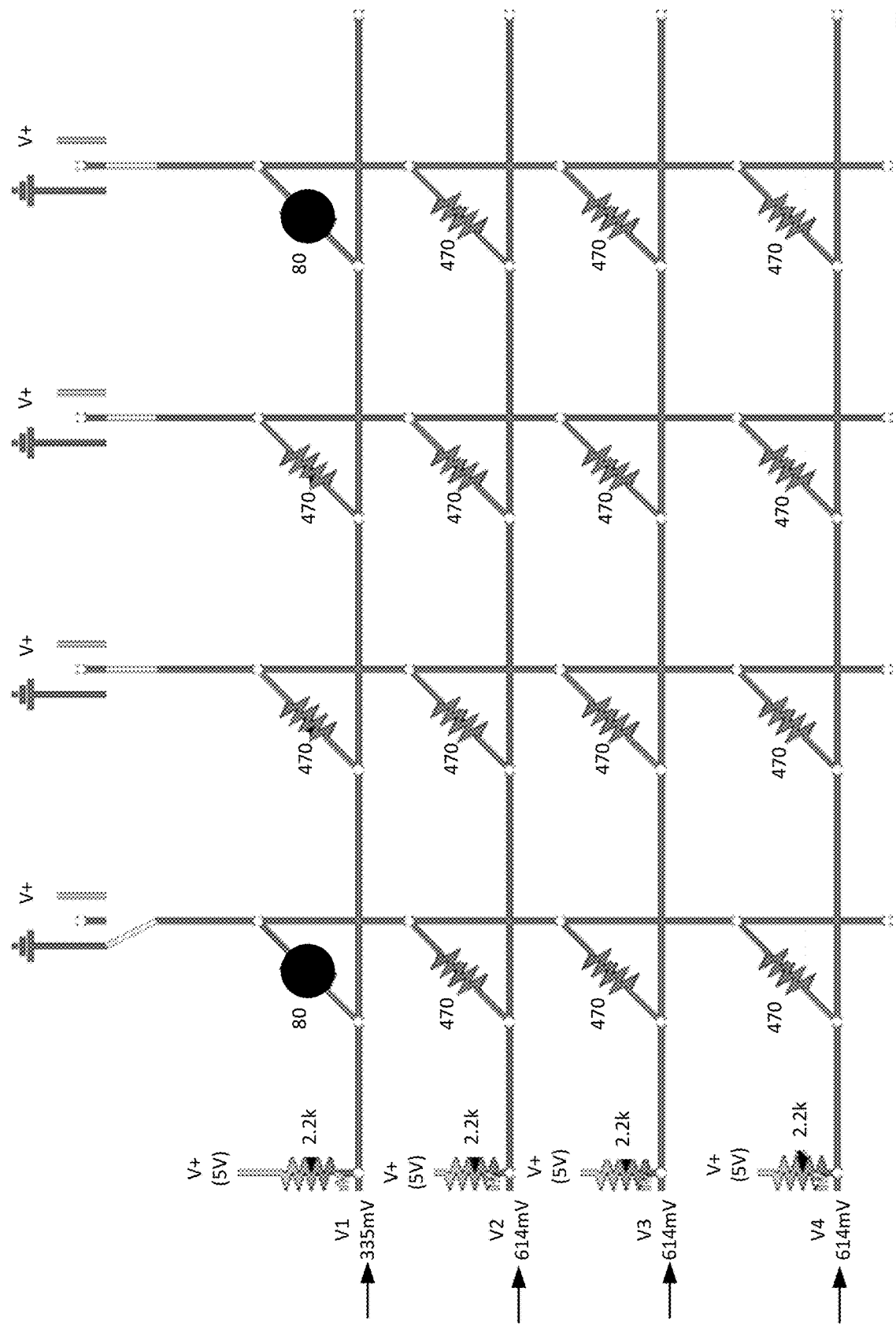
FIG. 5C and FIG. 5D are circuit diagrams that show examples of a grid-based sensing array with example component and input-output values for a high-sensitivity read with corresponding read values resulting from multiple contact points in accordance with some embodiments.

FIG. 5C illustrates a circuit diagram that shows an example of a grid-based sensing array with example component and input-output values for a high-sensitivity read with corresponding read values resulting from multiple contact points in accordance with some embodiments.

Example multi-contact occurring within a same row also yields to a change in sensed output V1' (row A) for a read of column A. However, the delta between V1' for a single contact and V1' for a multi-contact within the row is significantly reduced under the high-sensitivity read. Specifically, the sensed output V1' increases from 307 mV to 335 mV while contact force may remain unchanged for the high-sensitivity read, while for the low-sensitivity read the sensed output V1' increased from 1.8V to 2.9V. Thus, while a discrepancy exists (e.g., 10%) relative to a single contact, the change is significantly minimized relative to that due to halving in the low-sensitivity read. Applicants reiterate that example values are only examples that exist for the reader's benefit in understanding the disclosed techniques. Thus, the high-sensitivity read may be relied upon for an accurate force measurement at A,A, even where multiple contact are received (e.g., multiple sensing points are active). However, again, as can be seen V2'-V4' outputs also change (e.g., a difference between read voltage and tare value may further increase), and those changes could result in false contact point detection (e.g., where the difference exceeds a detection threshold), or ghost points, for other sensing points within column A for which no physical contact force is received. As shown, the likelihood of detecting a false contact may increase as additional contacts are received.

Figure 5D:
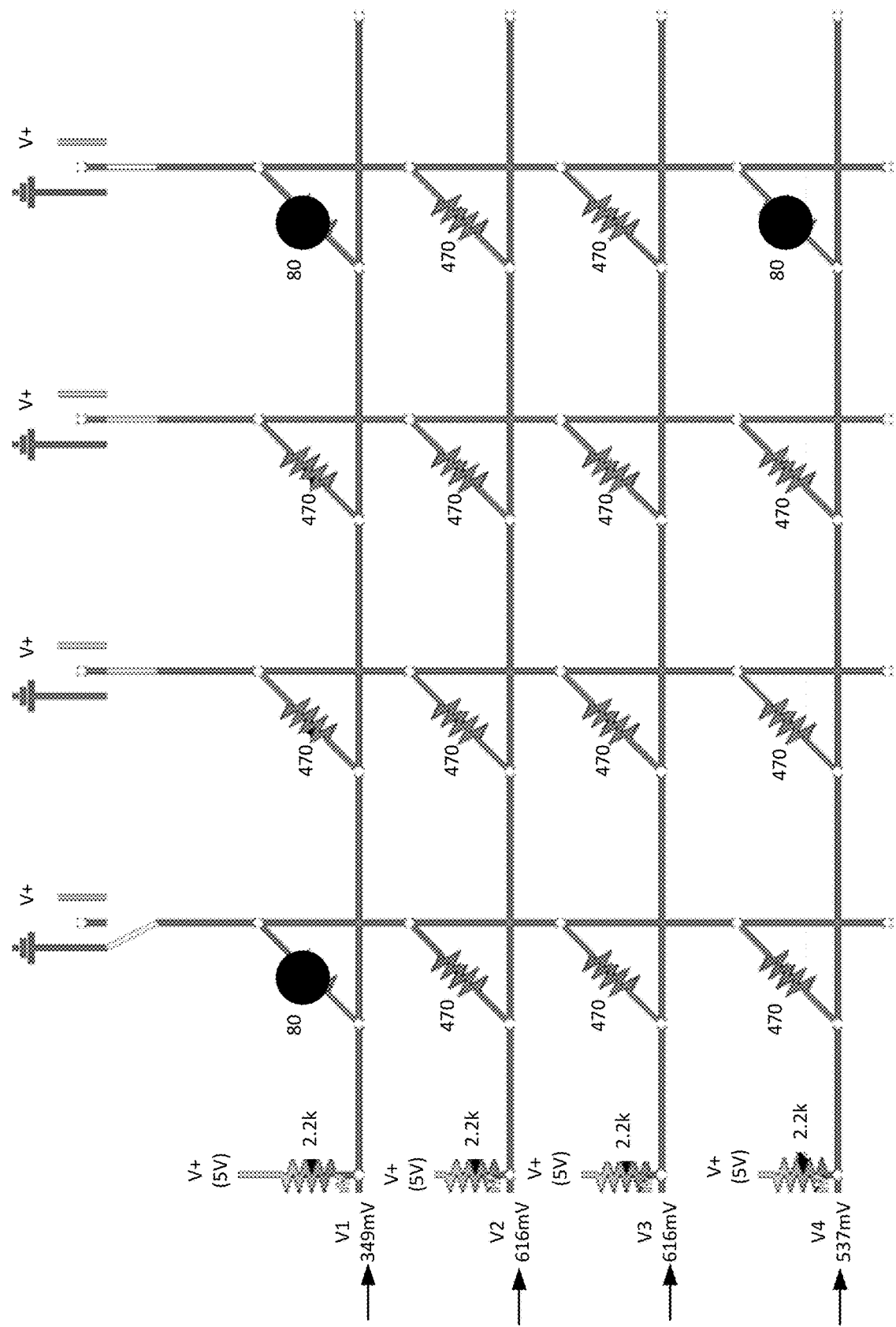

FIG. 5D illustrates a circuit diagram that shows an example of a grid-based sensing array with example component and input-output values for a high-sensitivity read with corresponding read values resulting from multiple contact points in accordance with some embodiments.

Example third contact yields to a change in sensed output V4' (row D) for a read of column A, as well as changes in V2' and V3' for which no contacts at sensing points within the row are made. Although a change occurs in sensed output V1' (row A), the value remains relatively stable when the new contact is added. Thus, the high-sensitivity read may be relied upon for an accurate force measurement at A,A, even where multiple contact are received (e.g., multiple sensing points are active). However, again, as can be seen V2'-V4' outputs also change (e.g., a difference between read voltage and tare value may further increase), and the row D output V4' changes even when no contact is received in column A. Here again, those changes could result in false contact point detection (e.g., where the difference exceeds a detection threshold), or ghost points, for other sensing points within column A for which no physical contact force is received. As shown, the likelihood of detecting a false contact may increase as additional contacts are received.

Figure 6:
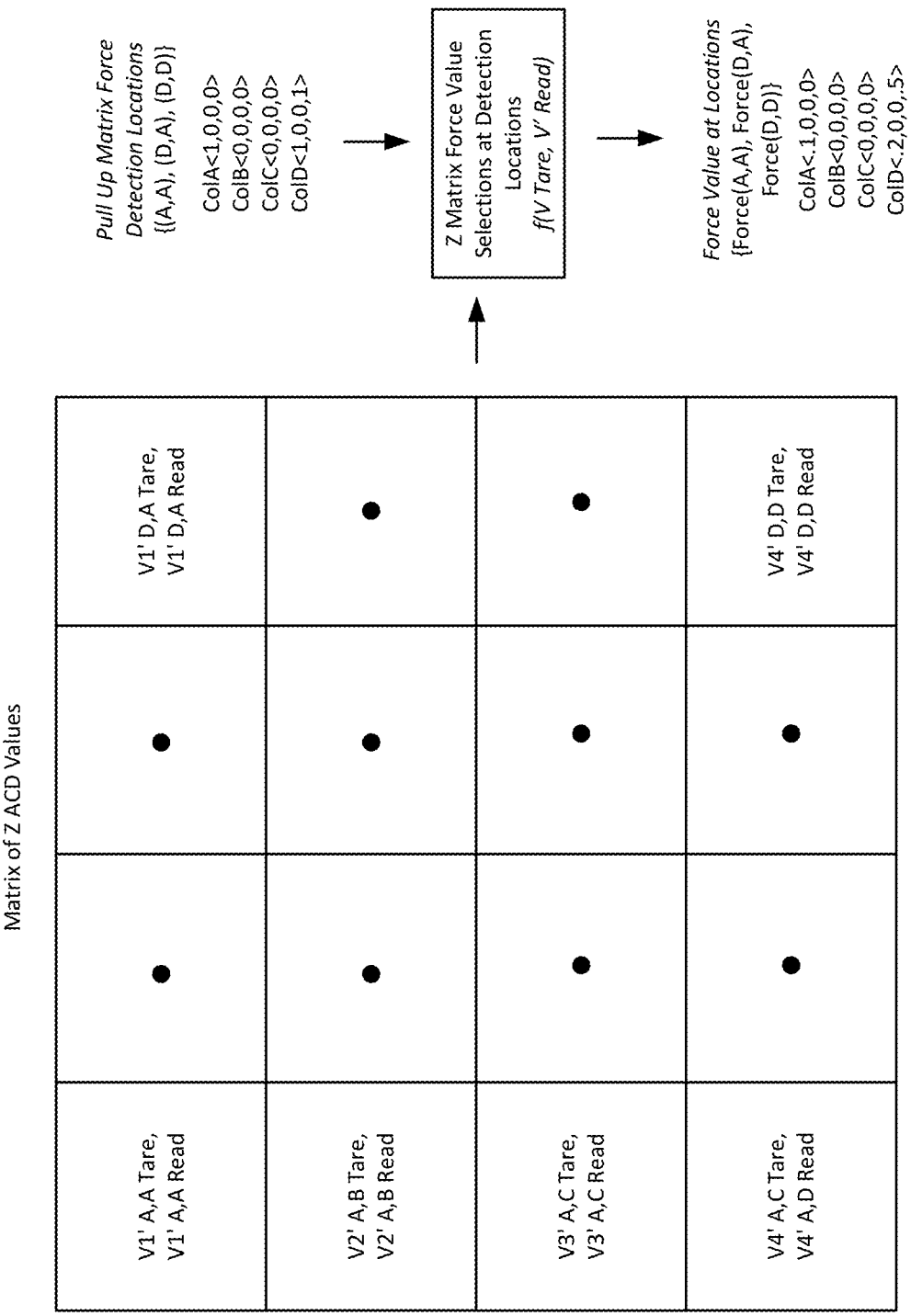
FIG. 6 is a data model and function block diagram that shows an example matrix of high-sensitivity read values and functions for measurement of force at detected force locations in accordance with some embodiments.

FIG. 6 illustrates a data model and function block diagram that shows an example matrix of high-sensitivity read values and functions for measurement of force at detected force locations in accordance with some embodiments.

Example data structures may be populated with tare values and sensed values for comparisons. Some embodiments may perform threshold detection, such as based on a difference between tare values and sensed values, to detect changes, or amounts of change (e.g., relative to a tare value).

In the context of the tactile sensing array example above for a read of column A, high-sensitivity values (e.g., voltage outputs for rows in column A from a read in high-sensitivity scan mode) may be stored. By iterating through a (e.g., high-sensitivity) scan of each column (or select columns) other read high-sensitivity values may be obtained.

As noted above, the low-sensitivity scan may afford more accurate detection of contact with sensing points to mitigate ghosting, but may afford a less accurate measure of force than the high-sensitivity scan. Threshold detection may be applied to low-sensitivity values to obtain force detection locations as described above. For example, threshold detection may identify locations (A,A) (D,A) and (D,D) as having received a contact force. High-sensitivity reads may be obtained with respect to those locations, such as from stored values from the example data structure of values obtained from a scan in high-sensitivity mode. Some embodiments may target columns (or area of an array) for a high-sensitivity scan that correspond to locations detected by the low-sensitivity scan rather than performing a high-sensitivity scan of each column (or the entire area of the array). In either case, high-sensitivity values may be obtained at the locations which force was detected via the low-sensitivity scan to locate contact points. The high-sensitivity scan values as those locations may be modified (e.g., based on respectively stored tare values, such as based on a difference between the read and tare value or other factors) to determine a force value at the location (e.g., by a force value function to determine force at a sensing point from high-sensitivity value read from the sensing point). High-sensitivity scan values in other locations may be ignored (or in some cases not read such as where no contact is reported within a column) or otherwise not selected for reporting (e.g., via a feedback mechanism) due to their susceptibility to ghost points (e.g., if threshold detection were applied in a manner similar to the low-sensitivity scan).

Thus, given a set of force detection locations determined based on threshold detection for sensed output values obtained via low-sensitivity scanning, sensed output values from a high-sensitivity scan may be obtained for detected locations within the set. A force value may be determined for each indicated location within the set, such as from the output of a force value function based on the high-sensitivity read value and the high-sensitivity tare value, as an indication of an amount of force at a detected contact point. Accordingly, one or more applied force value functions applied to high-sensitivity read values and tare values yields an output indicative of the sensed force at the sensing points that received a contact, e.g., A,A, D,A, and D,D in the prior example figure (and that set of sensing points may be determined based on processing of the low-sensitivity read values to localize contact points to mitigate detection of ghost points if localization were attempted based on high-sensitivity read values).

Figure 7:
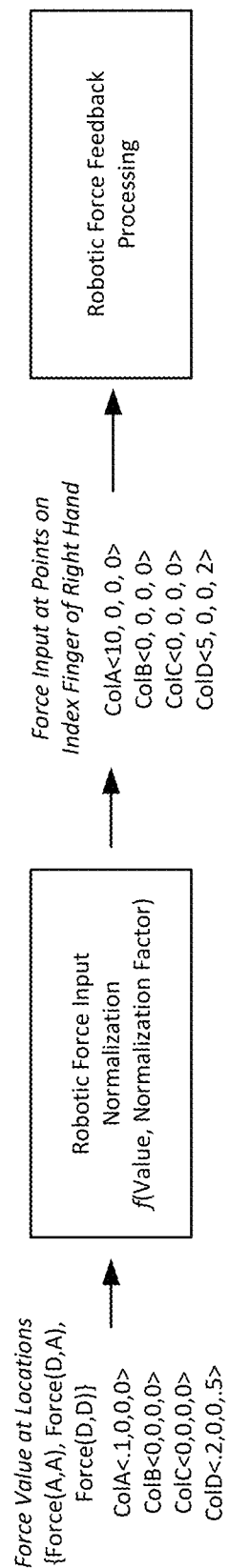
FIG. 7 is a data model and function block diagram that shows an example process by which measurements of force may be processed to render force feedback data for robotic processing systems in accordance with some embodiments.

FIG. 7 illustrates a data model and function block diagram that shows an example process by which measurements of force may be processed to render force feedback data for robotic processing systems in accordance with some embodiments.

Some embodiments may utilize disclosed dual-scanning techniques to detect force contacts on members, like fingertips, of a robot or other system including tactile sensors. For example, force sensitive resistor FSR technology may be utilized to sense actual pressure applied at the sensor on an object being manipulated. In one implementation, a tactile sensing array may provide a localization reading corresponding to a contact location and a force reading at each given contact location. These outputs can be provided to or read by a controller during intervals of a feedback loop in the controller and used as feedback data or used to derive feedback data provided to a neural network that generates actuator commands.

Dual-scanning techniques may be applied within the context of such sensors as outlined herein to improve contact detection and localization and measurement of force at contact points with minimized ghosting and increase of accuracy in measured force. As explained above, dual-scanning techniques are not limited to only FSR sensor types. Other examples of tactile sensors may include Hall effect proximity sensors or other proximity sensors, infrared emitters, or an infrared receiver/detector. The emitter and the receiver may be embedded in a translucent silicone housing. Other examples of tactile sensors may include GelSight sensors, strain gauge sensors, optical deflection sensors, and optical displacement sensors. The tactile sensing schemes may further include combinations of different sensor types, each of which may be read under two (or more) different scanning modes to mitigate disadvantages of any one type of scan or sensor.

As shown in FIG. 7, dual-scanning sensing data from a grid-based sensor array may be processed (e.g., to determine accurate contact locations and force at each contact location in the context of a tactile sensing array) and passed on for robotic force feedback processing (e.g., for the adjustment or control of an actuator or other element based on the feedback. In some embodiments, a robotic force input normalization function may translate contact force values at detected contact locations into values or a schema for feedback processing (e.g., such as to translate a detected force value for a contact to a range (e.g., on a scale of 1-10 or other scale) compatible with a feedback input schema).

Figure 8:
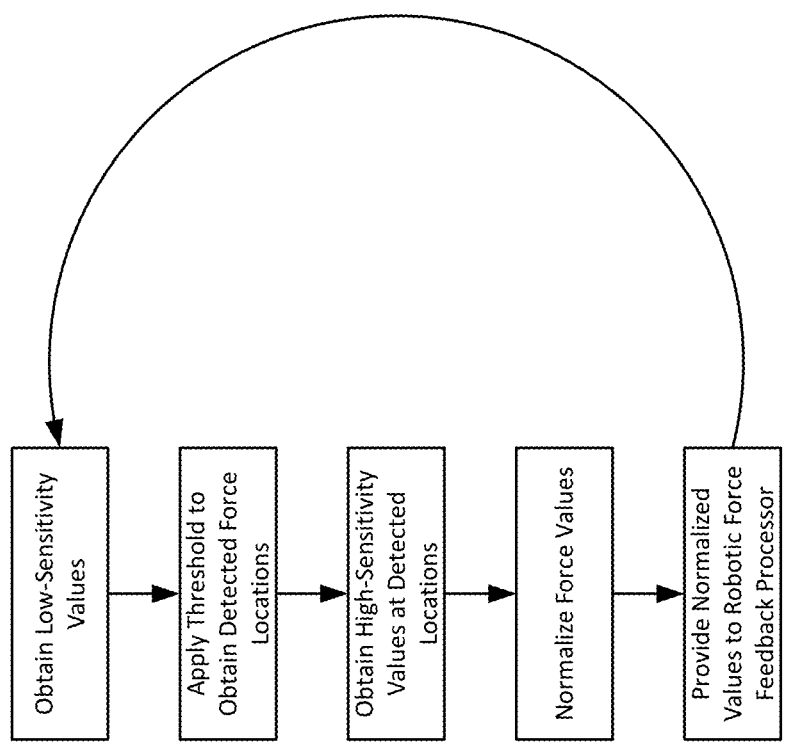
FIG. 8 is a flow chart that shows an example of a process by which multi-mode scanning of a grid-based tactile sensing array may be implemented in accordance with some embodiments.
Figure 9:
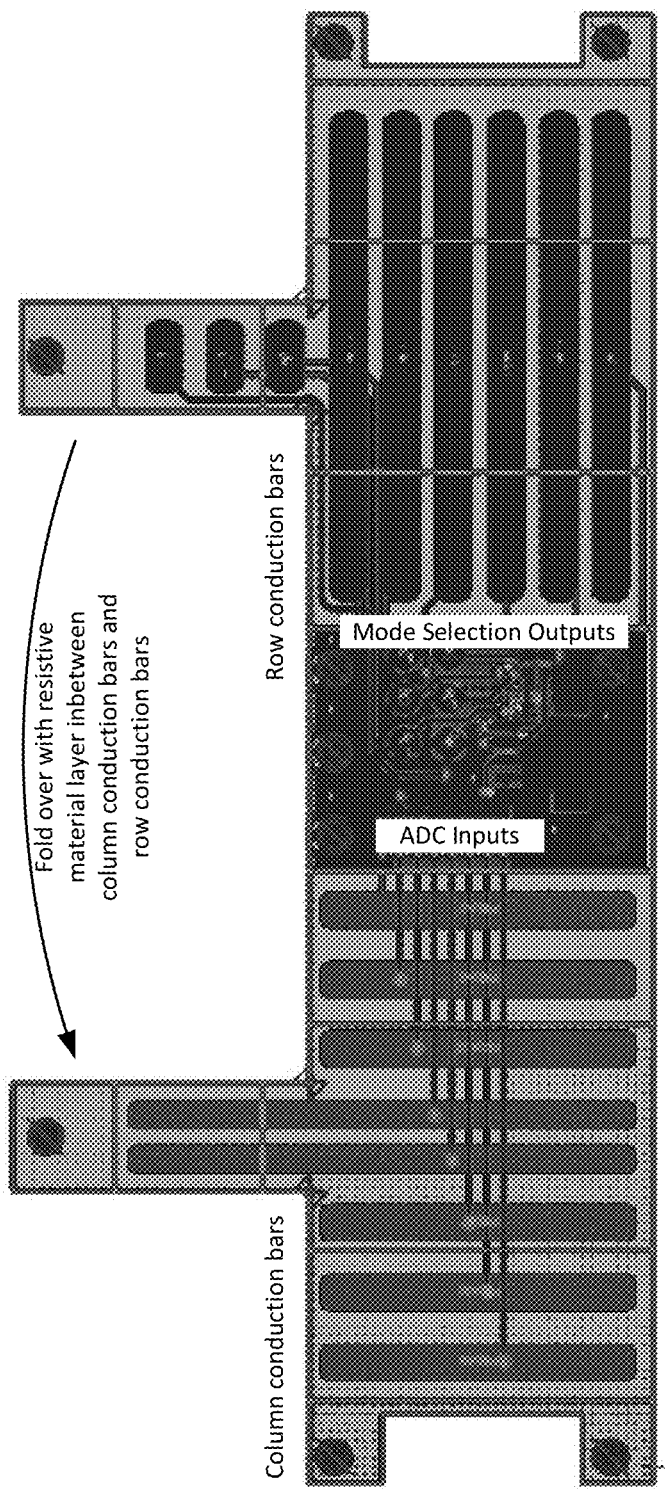
FIG. 9 depicts an example configuration and application of a flexible grid-based tactile sensing array system within which multi-mode scanning techniques may be implemented in accordance with some embodiments.

FIG. 8 is a flow chart that shows an example of a process by which multi-mode scanning of a grid-based tactile sensing array may be implemented in accordance with some embodiments, and FIG. 9 depicts an example configuration and application of a flexible grid-based tactile sensing array system within which multi-mode scanning techniques may be implemented in accordance with some embodiments.

Some example dual-scanning architectures may execute each scan at 0.5-2 khz, but other frequencies for dual-scan execution are contemplated and may generally each execute at half the frequency of a single scan if executed sequentially in an alternating fashion. However, as explained above, a first scan mode may be executed until one or more conditions (e.g., criteria, like detection of a contact) are met until executing a second scan mode, and then the modes may alternate for some period of time, or bias towards the second scan, until second criteria are met to revert to the first scanning mode and not the second (e.g., no contact is detected or moved or force value falls below a threshold at a contact point, etc.). Moreover, scan frequency may be adjustable based on other factors (e.g., a robot is not currently performing a function to which either scan, or a first scan, is applicable, so scanning frequency may be lowered to conserve power or stopped until some other criteria are met).

In some example contexts of a grid-based force sensitive tactile array, like in a fingertip, an area of rows and columns may be approximately 29×32 mm, and some rows or columns may be longer or shorter than others, such as to provide coverage for a fingertip and pad of a finger. Additionally, in such example context, bending of a FSR can increase challenges resolved by disclosed techniques, such as localization and scan-specific tare values, because wrapping around a round surface of sensitive material can increase the likelihood of false/existing readings. Some embodiments utilize a backing material with a constant or slowly changing radius with a smooth surface to reduce (among application of other disclosed techniques) the likelihood of false readings or stability of tare values.

Moreover, some embodiments provide for a configuration of a grid-based tactile sensing array that positions ADC inputs on an outside of a bend (e.g., such that the bend radius is increased relative to that if placed on an inside of a bend). Sensing ADC values on the outside of a bend can increase resolution by decreasing artifacts that can result from compacting rather than stretching (row or column) bars coupled to the ADC around the outside of the bend. Some example embodiments may utilize an 8, 10, or higher bit ADC to convert sensed voltage values to read values which are stored. Embodiments may map sensing point locations to a representation of a member of a robot where the respective sensing points are physically located for contact visualization by which the robot can determine which forces correspond to which contacts with an object visualized by other sensors (e.g., camera, lidar, etc.) to improve feedback loops for controlling actuators or other robotic mechanisms.

Thus, at least some embodiments of example sensors, control schemes, and scanning techniques disclosed herein may be implemented within the context of robots like that described in U.S. patent application Ser. No. 16/918,999, filed 1 Jul. 2020, titled "Artificial Intelligence-Actuated Robot," the entire contents of which are hereby incorporated by reference. Other types of robotics, user input devices, or other systems incorporating tactile feedback sensor arrays, and especially those which may benefit from flexible sensor arrays, may also be controlled by or otherwise utilize the present techniques for improved localization of contact points and force measurements at contact points, which are expected to be particularly beneficial in unstructured and semi-structured environments, like those encountered by drones or other robotic systems that interact with their environment.

In some cases, the sequence of the scans may be reversed, or the scans may be interleaved, e.g., scanning each column two ways before moving to the next. In some cases, the cross-bar array of sensing points may not have a diode at each sensing point, while affording readout from a cross-bar array that has more than 2, 4, 8, 16, or 32 bits of precision per sensing point. The terms "low sensitivity" and "high sensitivity" are intended to be relative to one another and do not require any absolute sensitivity, i.e., the terms are definite because it is enough that the "low sensitivity" mode be lower in sensitivity than the "high sensitivity" mode, regardless of their absolute amounts of sensitivity, which may be characterized by the bits of precision per sensing point determined from the output of a given scan.

Figure 10:
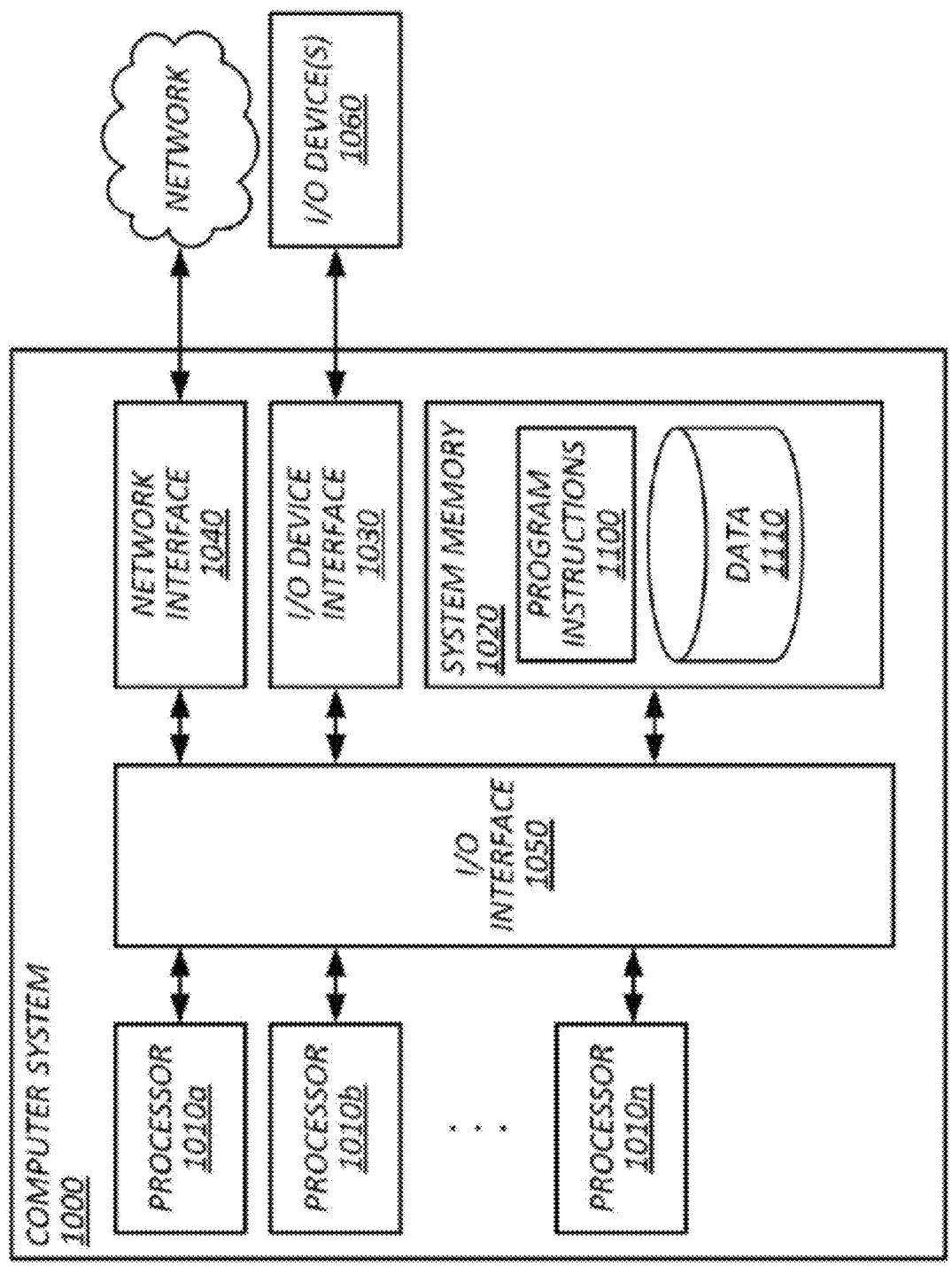
FIG. 10 is a physical architecture block diagram that shows an example of a computing device (or data processing system) by which some aspects of the above techniques may be implemented.

FIG. 10 is a physical architecture block diagram that shows an example of a computing device (or data processing system) by which some aspects of the above techniques may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) can be said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description is not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

I claim:

1. A method comprising:
executing a first scan of a force-sensitive tactile sensing array at a first sensitivitystate, wherein the force-sensitive tactile sensing array comprises a plurality of sensing points arranged in a plurality of columns in a grid, wherein executing the first scan of the force-sensitive tactile sensing arrayat the first sensitivity state comprises a plurality of iterations through the columns, wherein each iteration comprises switching only one of the columns to a first read mode and all other remaining columns to a first sensitivity state scanning mode, wherein the first read mode corresponds to coupling only one of the columns to ground and the first sensitivitystate scanning mode corresponds to coupling all other remaining columns to an input voltage;
determining one or more active sensing points from the plurality of sensing points based at least in part on an output of the first scan, wherein each active sensing point corresponds to a sensing point receiving a force greater than a threshold force;
executing a second scan of the force-sensitive tactile sensing arrayat a second sensitivity state that is different from the first sensitivity state, wherein executing the second scan of the force-sensitive tactile sensing arrayat the second sensitivity state comprises a plurality of iterations through the columns, wherein each iteration comprises switching only one of the columns to a second read mode and all other remaining columns to a second sensitivity state scanning mode, wherein the second read mode corresponds to coupling only one of the columns to ground and the second sensitivity state scanning mode corresponds to no input condition at all other remaining columns or coupling all other remaining columns to a high-impedance circuit; and
determining a force value for at least one active sensing point of the one or more active sensing points based at least in part on an output of the second scan.

2. The method of claim 1, wherein each switching of only one of a given column to the first read mode and switching of all other remaining columns to the first sensitivity state scanning mode produces a first sensed value for each of the sensing points in only one of the given column associated with the first sensitivity state.

3. The method of claim 2, further comprising executing a third scan of the force-sensitive tactile sensing array to read tare values for the plurality of sensing points prior to executing the first scan of the force-sensitive tactile sensing array.

4. The method of claim 3, wherein determining the one or more active sensing points comprises determining each sensing point having a difference between a respective first sensed value and a respective tare value above a threshold.

5. The method of claim 3, wherein each switching of only one of the given column to the second read mode and switching of all the other remaining columns to the second sensitivity state scanning mode produces a second sensed value for each of the sensing points in only one of the given column associated with the second sensitivity state.

6. The method of claim 5, wherein determining the force value for the at least one active sensing point comprises determining the force value based on a difference between the second sensed value and the tare value for the at least one active sensing point.

7. The method of claim 1, wherein executing the second scan of the force-sensitive tactile sensing array comprises outputting a higher bit integer value indicative of a magnitude of force for each of the active sensing points.

8. The method of claim 1, wherein the second sensitivity state is higher than the first sensitivity state.

9. A system comprising:
a force-sensitive tactile sensor sensing array comprising a plurality of sensing points arranged in a plurality of columns in a grid; one or more processors communicatively coupled to the force-sensitive tactile sensing array; and one or more computer readable storage media storing instructions that when executed cause the one or more processors to perform operations comprising:
executing a first scan of the force-sensitive tactile sensing array to produce an output of the first scan at a first sensitive state, wherein executing the first scan of the force-sensitive tactile sensing array at the first sensitivitystate comprises a plurality of iterations through the columns, wherein each iteration comprises switching only one of the columns to a first read mode and all other remaining columns to a first sensitivitystate scanning mode, wherein the first read mode corresponds to coupling only one of the columns to ground and the first sensitivity state scanning mode corresponds to coupling all other remaining columns to an input voltage;
obtaining the output of the first scan of the force-sensitive tactile sensing array at the first sensitivitystate;
determining one or more active sensing points from the plurality of sensing points based at least in part on the output of the first scan, wherein each active sensing point corresponds to a sensing point receiving a force greater thana threshold force;
executing a second scan of the force-sensitive tactile sensing array to produce an output of the second scan at a second sensitivity state that is higher than the first sens itivity state, wherein executing the second scan of the force-sensitive tactile sensing arrayat the second sensitivity state comprises a plurality of iterations through the columns, wherein each iteration comprises switching only one of the columns to a second read mode and all other remaining columns to a second sensitivity state scanning mode, wherein the second read mode corresponds to coupling only one of the columns to ground and the second sensitivitystate scanning mode corresponds to no input condition at all other remaining columns or coupling all other remaining columns to a high-impedance circuit; and determining a force value for at least one active sensing point of the one or more active sensing points based at least in part on the output of the second scan.

10. The system of claim 9, wherein executing the first scan of the force-sensitive tactile sensing array comprises outputting a binary value for each of the plurality of sensing points, and wherein each switching of only one of a given column to the first read mode and switching of all other remaining columns to the first sensitivity state scanning mode produces a first sensed value for each of the sensing points in only one of the given column associated with the first sensitivity state.

11. The system of claim 10, wherein the operations further comprise executing a third scan of the force-sensitive tactile sensing array to read tare values for the plurality of sensing points prior to executing the first scan of the force-sensitive tactile sensing array.

12. The system of claim 11, wherein determining one or more active sensing points from the plurality of sensing points comprises determining each sensing point having a difference between a respective first sensed value and a respective tare value above a threshold.

13. The system of claim 12, wherein each switching of only one of the given column to the second read mode and switching of all the other remaining columns to the second sensitivity state scanning mode produces a second sensed value for each of the sensing points in only one of the given column associated with the second sensitivity state.

14. The system of claim 13, wherein determining the force value for the at least one active sensing point based on the output of the second scan comprises determining the force value based on a difference between the second sensed value and the tare value for the at least one active sensing point.

15. The system of claim 9, wherein executing the first scan of the force-sensitive tactile sensing array comprises outputting a binary value for each of the plurality of sensing points, and wherein executing the second scan of the force-sensitive tactile sensing array to produce the output of the second scan comprises outputting a higher bit integer value of a magnitude of force for each of the active sensing points.

* * * * *